(12) United States Patent
Kirkwood et al.

(10) Patent No.: US 10,953,626 B2
(45) Date of Patent: Mar. 23, 2021

(54) COATED ARTICLES AND METHODS FOR MAKING THE SAME

(71) Applicants: AXALTA COATING SYSTEMS IP CO., LLC, Wilmington, DE (US); Georgia-Pacific Gypsum LLC, Atlanta, GA (US)

(72) Inventors: John E. Kirkwood, Winston-Salem, NC (US); Michael D. Foster, Jamestown, NC (US); Herbert D. Temple, Archdale, NC (US); James E. Bailey, Trinity, NC (US); Michael Deal, Kernersville, NC (US); Charles R. Harrison, Acworth, GA (US); Christopher J. Sanders, Southaven, MS (US); Yi-Hsien Teng, Duluth, GA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 193 days.

(21) Appl. No.: 15/528,444

(22) PCT Filed: Nov. 20, 2015

(86) PCT No.: PCT/US2015/061992
§ 371 (c)(1),
(2) Date: May 19, 2017

(87) PCT Pub. No.: WO2016/081903
PCT Pub. Date: May 26, 2016

(65) Prior Publication Data
US 2017/0341337 A1 Nov. 30, 2017

Related U.S. Application Data

(60) Provisional application No. 62/083,002, filed on Nov. 21, 2014.

(51) Int. Cl.
*B32B 5/26* (2006.01)
*B05D 1/36* (2006.01)
(Continued)

(52) U.S. Cl.
CPC .............. *B32B 5/26* (2013.01); *B05D 1/36* (2013.01); *B28B 5/026* (2013.01);
(Continued)

(58) Field of Classification Search
None
See application file for complete search history.

(56) References Cited

U.S. PATENT DOCUMENTS 2,291,616 A * 8/1942 Fletcher ................. D21H 19/52
427/326
7,553,780 B2 * 6/2009 Smith .................... B32B 13/14
442/131
(Continued)

*Primary Examiner* — Shawn Mckinnon
(74) *Attorney, Agent, or Firm* — Lorenz & Kopf, LLP

(57) ABSTRACT

A method of forming a coating layer on a fibrous mat to make a coated article includes depositing a coating composition on a carrier material and at least partially embedding a first major surface of a fibrous mat in the coating composition, the fibrous mat including a plurality of mat fibers. The coating composition is at least partially hardened to form a coating layer at the first major surface of the fibrous mat. A second major surface of the fibrous mat opposite the first major surface includes an uncoated portion of the plurality of mat fibers.

26 Claims, 24 Drawing Sheets

(51) Int. Cl.
*B32B 13/14* (2006.01)
*B28B 5/02* (2006.01)
*B32B 5/02* (2006.01)
*E04C 2/04* (2006.01)
*E04C 2/26* (2006.01)
*B28B 19/00* (2006.01)
*B29C 70/00* (2006.01)

(52) U.S. Cl.
CPC .......... *B28B 19/0092* (2013.01); *B29C 70/00* (2013.01); *B32B 5/022* (2013.01); *B32B 5/024* (2013.01); *B32B 13/14* (2013.01); *E04C 2/043* (2013.01); *E04C 2/26* (2013.01); *B32B 2255/00* (2013.01); *B32B 2255/02* (2013.01); *B32B 2255/20* (2013.01); *B32B 2255/26* (2013.01); *B32B 2260/021* (2013.01); *B32B 2260/023* (2013.01); *B32B 2260/044* (2013.01); *B32B 2260/046* (2013.01); *B32B 2262/101* (2013.01); *B32B 2307/718* (2013.01); *B32B 2419/04* (2013.01); *B32B 2607/00* (2013.01)

(56) References Cited

U.S. PATENT DOCUMENTS

| | | | |
|---|---|---|---|
| 2002/0160677 A1* | 10/2002 | Loffler | D06N 1/00 442/180 |
| 2003/0031854 A1* | 2/2003 | Kajander | B32B 13/14 428/304.4 |
| 2005/0181693 A1* | 8/2005 | Kajander | B32B 5/02 442/172 |
| 2008/0176050 A1* | 7/2008 | Lintz | C04B 41/009 428/213 |

* cited by examiner

US 10,953,626 B2

COATED ARTICLES AND METHODS FOR MAKING THE SAME

CROSS REFERENCE TO RELATED APPLICATIONS

This application is a national stage entry under 35 U.S.C. § 371 of PCT Application No. PCT/US2015/061992, filed Nov. 20, 2015, which claims the benefit of U.S. Provisional Application No. 62/083,002, filed Nov. 21, 2014. The entire contents of PCT Application No. PCT/US2015/061992 and U.S. Provisional Application No. 62/083,002 are incorporated herein by reference.

BACKGROUND

Interior or exterior building wallboard panels can include a core of set gypsum sandwiched between a woven or non-woven mat-like fibrous facing material. A coating layer on an exposed major surface of the facing material opposite the gypsum core can provide resistance to environmental degradation, and improve manufacturing and performance characteristics, such as strength.

Attempts have been made to make a coated facing material for a wallboard by saturating a bare fiberglass mat with a waterborne or radiation curable coating composition, removing excess coating composition via a knife coating process, and hardening the coating composition to form a single coating layer extending across the thickness of the mat. A slurry of gypsum may then be deposited on a major surface of the coated mat and then overlain with a second coated or uncoated mat. The resulting sandwich-like construction may be dried to form a wallboard.

In coated mats made using the above-described process, the coating layer tends to concentrate toward the center of the mat, and mat fibers typically protrude from both exposed major surfaces of the coated mat. The protruding mat fibers roughen the exposed major surfaces of the coating layer, which can be difficult to finish with an overcoat of paint or adhesive (e.g., for applying construction materials such as roof tiles or bathroom tiles thereto). If the mat is made of fiberglass, the sharp protruding fibers can make handling and installation of the mats difficult for workers in the construction industry.

In addition, in the knife coating process, the amount of coating composition residing on the exposed major surfaces of the mat can be difficult to accurately control, which results in a coating layer that has a highly variable thickness. For example, a thin coating layer can include many protruding fibers and can be rough or difficult to finish. A thick coating layer can be made to prevent fiber protrusion, but the surface of the coating layer can be too smooth to properly adhere to another coating or material, and the excess coating weight increases costs and installation difficulties.

SUMMARY

In one aspect, the present disclosure is directed to a method of making a coated article, including:
 depositing a coating composition on a carrier material;
 at least partially embedding a first major surface of a fibrous mat in the coating composition, the fibrous mat including a plurality of mat fibers; and
 at least partially hardening the coating composition to form a coating layer at the first major surface of the fibrous mat,
 wherein a second major surface of the fibrous mat opposite the first major surface includes an uncoated portion of the plurality of mat fibers.

In another aspect, the present disclosure is directed to a method of making a coated article, including:
 applying an ultraviolet curable coating composition to a first major surface of a fibrous mat including a plurality of mat fibers; and
 applying radiation to the fibrous mat to at least partially cure the ultraviolet curable coating composition and form a coating layer at the first major surface of the fibrous mat,
 wherein a second major surface of the fibrous mat opposite the first major surface includes an uncoated portion of the plurality of mat fibers.

In another aspect, the present disclosure is directed to a method of making a coated gypsum panel, including:
 applying an ultraviolet curable coating composition to a first major surface of a gypsum panel, the gypsum panel including a gypsum core faced with a first fibrous mat,
 wherein the first fibrous mat includes the first major surface of the gypsum panel; and applying radiation to the first major surface of the gypsum panel to at least partially cure the ultraviolet curable coating composition and form a coating layer at the first major surface of the gypsum panel,
 wherein the coating layer has an average penetration of the first fibrous mat of less than a first thickness of the first fibrous mat.

In another aspect, the present disclosure is directed to a method of making a coated article, including:
 contacting a first major surface of a fibrous mat with a carrier material, the fibrous mat including a plurality of mat fibers;
 applying a filler liquid to the fibrous mat to displace a predetermined volume of air residing between the mat fibers;
 depositing a coating composition on a second major surface of the fibrous mat opposite the first major surface, the coating composition being immiscible with the filler liquid and forming an interface with the filler liquid; and
 at least partially hardening the coating composition to form a coating layer extending at least between the interface and the second major surface of the fibrous mat.

In another aspect, the present disclosure is directed to a coated fibrous mat, including:
 an ultraviolet radiation-cured coating layer on a first major surface of a fibrous mat including a plurality of mat fibers,
 wherein a second major surface of the fibrous mat opposite the first major surface includes an uncoated portion of the plurality of mat fibers.

In another aspect, the present disclosure is directed to a coated gypsum panel, including:
 an ultraviolet radiation-cured coating layer on a first major surface of a gypsum panel, the gypsum panel including a set gypsum core faced with a first fibrous mat, wherein the first fibrous mat includes the first major surface of the gypsum panel,
 wherein the coating layer has an average penetration of the first fibrous mat of less than a first thickness of the first fibrous mat.

In another aspect, the present disclosure is directed to a method for forming a coating layer on a fibrous mat, including:
 depositing a coating composition on a carrier material;
 at least partially embedding a first major surface of a fibrous mat in the coating composition, wherein the fibrous mat includes an arrangement of mat fibers;

at least partially hardening the coating composition to form a coating layer concentrated on the first major surface of the fibrous mat, wherein a second major surface of the fibrous mat opposite the first surface includes a plurality of free uncoated mat fibers.

In another aspect, the present disclosure is directed to a method for making a coating layer on a fibrous mat, including:

depositing an ultraviolet (UV) curable coating composition on a carrier material;

embedding a first major surface of a fibrous mat in the coating composition, wherein the fibrous mat includes an arrangement of glass fibers, and wherein the fibrous mat has a first thickness;

at least partially curing the UV curable coating composition through a second major surface of the fibrous mat opposite the first major surface to form a coating layer concentrated on the first major surface of the fibrous mat, wherein the coating layer has a second thickness less than the first thickness, and wherein a second major surface of the coated mat includes a plurality of free glass fibers.

In another aspect, the present disclosure is directed to a coating concentrated on a first major surface of a fibrous mat, wherein the coating includes a continuous, non-porous coating layer with a thickness less than a thickness of the fibrous mat, and wherein a second major surface of the fibrous mat opposite the first major surface thereof includes a plurality of uncoated protruding fibers.

In another aspect, the present disclosure is directed to an article, including:

a first fibrous mat including a plurality of fibers, wherein the first fibrous mat includes a first major surface and a second major surface opposite the first major surface, wherein the first fibrous mat has a first thickness, wherein the first major surface includes thereon a continuous, non-porous coating layer with a second thickness less than the first thickness, and wherein substantially no fibers protrude from the coating layer;

a gypsum-containing layer on the second major surface of the first fibrous mat, wherein fibers from the second major surface of the first fibrous mat project into a first major surface of the gypsum-containing layer; and a second fibrous mat on the second major surface of the gypsum-containing layer, wherein the second fibrous mat comprises fibers extending into the second major surface of the gypsum-containing layer.

In another aspect, the present disclosure is directed to a method for forming a coating layer on a fibrous mat, including:

contacting a first major surface of the fibrous mat with a carrier material, wherein the fibrous mat includes an arrangement of mat fibers;

applying a filler liquid to the fibrous mat to displace a predetermined volume of the air residing between the mat fibers;

depositing a coating composition on a second major surface of the fibrous mat, wherein the second major surface is opposite the first major surface, and wherein the filler liquid is immiscible with the coating composition and forms an interface with the coating composition; and at least partially hardening the coating composition to form a coating layer at the interface with the filler liquid, wherein the coating layer is concentrated on the second major surface of the fibrous mat.

In another aspect, the present disclosure is directed to a method for forming a coating layer on a fibrous mat, including:

contacting a fibrous mat with a carrier material, wherein the fibrous mat includes an arrangement of mat fibers;

applying a first coating composition to the fibrous mat;

applying a second coating composition on the first coating composition, wherein the second coating composition is different from the first coating composition; and at least partially hardening at least the second coating composition to form a coating layer concentrated on a major surface of the fibrous mat.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6A shows a coating layer with a thickness of about 1.5 mil (0.04 mm) (left) and a coating layer with a thickness of about 2 mil (0.05 mm) (right). FIG. 6B is a close-up photograph of the 1.5 mil (0.04 mm) coating layer, while FIG. 6C is a close-up photograph of the 2.0 mil (0.05 mm) coating layer.

FIG. 13A is a photograph of a surface of the first coating layer formed on a fibrous mat from the coating composition of Table 8 in Example 8, while

FIG. 14A is a photograph of a surface of the second coating layer formed on a fibrous mat from the coating composition of Table 9 in Example 8, while

FIG. 15A is a photograph of a surface of the dual-coated fibrous mat of FIG. 14A, while

Like symbols in the figures represent like elements.

DETAILED DESCRIPTION

The present disclosure relates to coatings for coated articles, articles to which the coatings are applied, and methods for the manufacture thereof. For example, the coated articles may be fibrous mats or construction panels (e.g., boards or wallboards), although the coating methods disclosed herein may also be used to manufacture other coated articles. The methods described herein allow for the controlled application of a coating composition to an article, and the subsequent formation of a dry coating layer having a controlled thickness and/or weight. In certain embodiments, the coating layer penetrates the surface of the article to which it is applied (e.g., a fibrous mat) only partially. That is, the coating composition may be applied in such an amount and via a particular application technique such that the coating layer penetrates less than a thickness of the article to which it is applied. Thus, in a fibrous mat, the coating composition may penetrate only a portion of the thickness of the fibrous mat, such that the formed coating layer is concentrated at the major surface to which the coating composition was applied and the opposed major surface remains uncoated.

The process of the present disclosure allows precise control over the thickness of the coating layer concentrated on the first major surface of the fibrous mat. Presently available methods for making fibrous mat coatings are much less precise, and require a coating layer with a thickness of greater than about 2.5 mils (about 0.06 mm) to control fiber protrusion and provide an exposed surface of the coating layer with desired properties. The present disclosure allows precise control over the smoothness and surface characteristics (such as fiber protrusion) of coating layers of any thickness, such as coating layers having a thickness of up to about 10 mils (about 0.25 mm).

Thus, articles of the present disclosure may display a smoother face, less disengagement of fibers, fillers, and gypsum, as well as improved adhesion of other coatings and materials. Moreover, the process may advantageously be incorporated upstream (e.g., in-line or off-line) of gypsum panel manufacturing processes or downstream (e.g., in-line or off-line) of gypsum panel manufacturing processes.

In certain embodiments, the coated articles include a cured or hardened coating layer on a first major surface of a fibrous mat and an uncoated portion of mat fibers of the fibrous mat on a second major surface opposite the first major surface. As used herein, the term "uncoated" when used to describe a portion of fibers forming a major surface opposite the coated surface refers to the fibers being uncoated by the coating composition that forms the coating layer on the first major surface. The fibers of the second major surface may be coated by another material, such as, for example, a gypsum slurry to form a gypsum panel. In certain embodiments, the coating layer is an ultraviolet radiation-cured coating layer.

Figure 1:
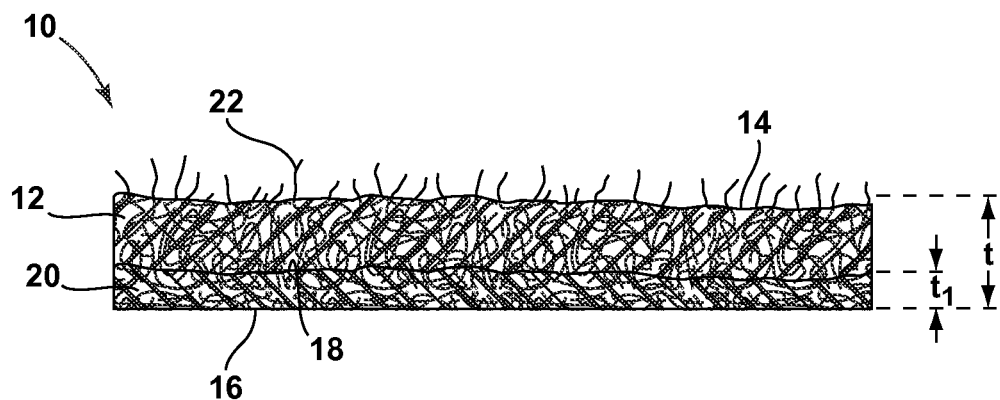
FIG. 1 is a cross-sectional view of a fibrous mat including a coating layer at a first major surface thereof.

FIG. 1 is a schematic cross-sectional representation of a coated fibrous mat construction 10 including a woven or non-woven fibrous mat 12 with an approximate thickness t (also referred to herein as the "first thickness"). The coated fibrous mat construction 10 has a first major surface 16 and an opposed second major surface 14, with the thickness t representing the average distance between the first and second major surfaces. A coating layer 18, which in some embodiments is a cured polymeric coating layer, is on the first major surface 16 of the coated fibrous mat construction 10. The coating layer 18 penetrates the mat 12 such that a plurality of the mat fibers 20 (which are not drawn to scale) along the first major surface 16 is embedded in the coating layer 18.

In some embodiments, the fibrous mat has a weight of from about 1 lb/csf (0.049 kg/m$^2$) to about 3.5 lb/csf (0.17 kg/m$^2$). In certain embodiments, the fibrous mat is a non-woven fiberglass mat containing a plurality of mat fibers. In certain embodiments, because the coating composition may be applied in a more precise, controlled manner, the glass fibers of a fibrous mat may be longer and/or have a larger diameter than the glass fibers that are typically used in such applications.

The coating layer 18 has an approximate thickness $t_1$ that is less than t. That is, the coating layer has an average penetration of the fibrous mat of less than the thickness t of the fibrous mat. In various embodiments, $t_1$ is less than about 80% of t, or less than about 60% of t, or less than about 50% of t, or greater than about 5% of t, or greater than about 10% of t, or greater than about 20% of t, or greater than about 30% of t. In some embodiments, the coating layer has an average penetration of the fibrous mat of from about 10 percent to about 60 percent of the thickness of the fibrous mat. In some embodiments, the coating layer has an average penetration of the fibrous mat of from about 30 percent to about 50 percent of the thickness of the fibrous mat.

The coated fibrous mat construction 10 includes an uncoated portion of the mat fibers 22 (not to scale) extending from the second major surface 14 thereof, but substantially no mat fibers extend outward from the coating layer 18 on the first major surface 16.

As shown in the embodiment of FIG. 1 and the examples below, the coating layer 18 of the coated fibrous mat construction 10 may be a substantially continuous film that is smoothly and evenly applied on the first major surface 16 of the fibrous mat 12 with substantially no macroscopic gaps or open areas.

In some embodiments the coating layer is substantially continuous, which in this application refers to a smooth film with substantially no open, uncoated areas in which the fibers of the fibrous mat are exposed. In various embodiments, the coating layer 18 can be evenly applied with a thickness $t_1$ of about 0.1 mils to about 10 mils (0.0025 mm to 0.254 mm). In some embodiments, the coating layer has a thickness of less than about 5 mils (0.127 mm), or from about 0.1 mils to about 4 mils (0.102 mm), or of less than about 2.5 mils (0.0635 mm).

In some embodiments, the substantially continuous coating layer captures all of the surface fibers at the first major surface of the fibrous mat, which can minimize disengagement of the fibers from the surface. In other embodiments, the substantially continuous coating layer captures a majority of the surface fibers at the first major surface of the fibrous mat, which can also minimize disengagement of the fibers from the surface. For the end user, this creates a relatively smooth surface that is easier to finish and decreases the likelihood of irritation from fiber disengagement when handling the product (e.g., dusting and itch).

In some embodiments, the coating layer has a weight of from about 5 lb/msf (0.024 kg/m$^2$) to about 50 lb/msf (0.24 kg/m$^2$). In one embodiment, the coating layer has a weight of from about 15 lb/msf (0.073 kg/m$^2$) to about 30 lb/msf (0.15 kg/m$^2$).

As further illustrated by the embodiment of FIG. 1, an uncoated portion of the mat fibers 22 extend or partially extend in random directions and arrangements outward at the second major surface 14 of the coated fibrous mat construction 10. The portion of fibers 22 thus remains available for mechanically interlocking or bonding with subsequently applied layers, such as, for example, a gypsum or other panel slurry material.

In alternative embodiments illustrated in the examples below, the coating layer can be a porous discontinuous film with randomly formed voids and apertures, or may be concentrated only in random or predetermined areas of the fibrous mat 12. In this application "discontinuous" means that the coating layer does not form a continuous or uninterrupted two-dimensional film over the fibrous mat and areas remain in which the film is interrupted and the fibrous mat is exposed, or only certain areas of the fibers are coated by the coating layer.

Figure 2:
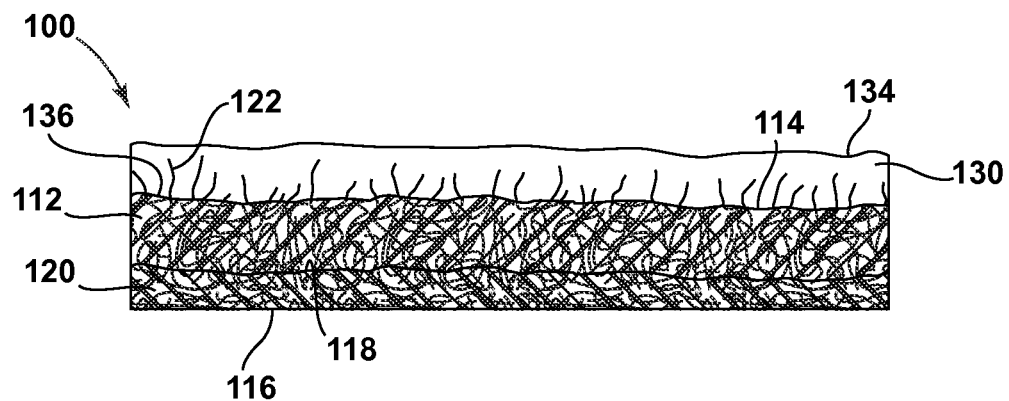
FIG. 2 is a cross-sectional view of the coated fibrous mat of FIG. 1 with an additional material layer applied to a second major surface opposite the first major surface.

Referring to FIG. 2, an article (such as a panel, board, or wallboard) construction 100 includes a woven or non-woven fibrous mat 112 with a second major surface 114 and a first major surface 116. A coating layer 118 is disposed at the first major surface 116 of the article construction 100. The coating layer 118 penetrates the mat 112 such that a plurality of the mat fibers 120 (which are not drawn to scale) is embedded in the coating layer 118. The article construction 100 includes a plurality of mat fibers 122 that are not coated by the coating layer, which extend outwardly from the second major surface 114 of the fibrous mat 112 and are embedded in and mechanically interlocked with a core layer 130 (e.g., a set gypsum core).

The core layer 130 may vary widely depending on the type of board application desired, but in one embodiment includes a set gypsum core of calcium sulfate dihydrate ($CaSO_4 \cdot 2H_2O$). A gypsum core may be formed from a gypsum slurry containing finely ground particles of calcined gypsum (calcium sulfate hemihydrate), which is also be referred to herein as gypsum stucco. However, the core layer 130 is not limited to gypsum cores, and in other embodiments can include, for example, polymeric materials such as polyisocyanurate foams. Exemplary methods of making gypsum based articles may be found in U.S. Pat. No. 7,553,780.

The core layer 130 includes a first major surface 134 and a second major surface 136. At the second major surface 136, the core layer 130 is entangled with the mat fibers 122 extending from the second major surface 114 of the fibrous mat 112, which can enhance bond strength at the interface between the wallboard core layer 130 and the fibrous mat 112. For example, while not wishing to be bound by any theory, in embodiments in which the core layer 130 is a gypsum board core, presently available evidence indicates that gypsum particles in the wallboard core layer 130 crystallize around and become mechanically entangled and interlocked with the uncoated fibers 122, which forms a strong bond at the interface between the core layer 130 and the fibrous mat 112.

Figure 3:
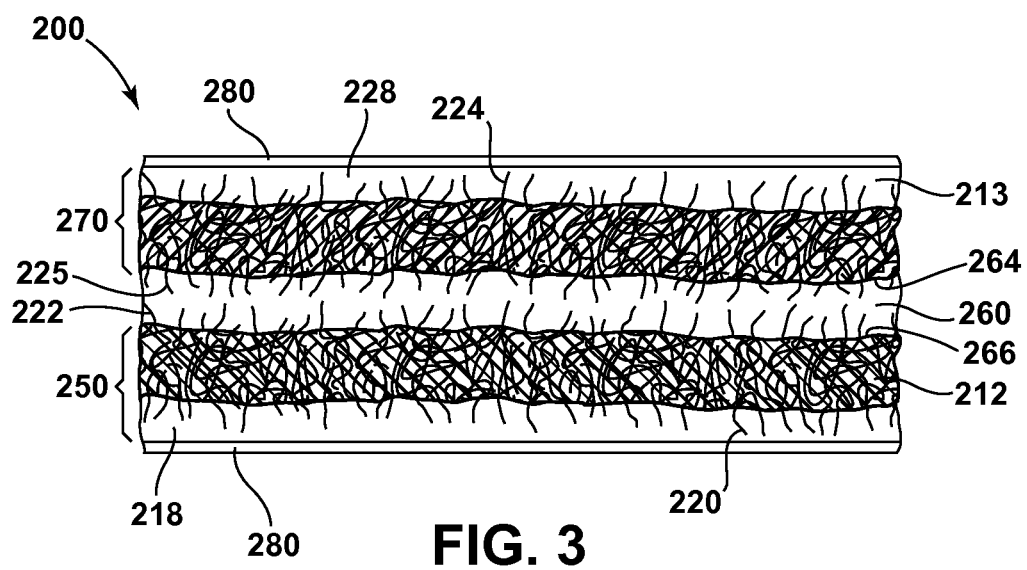
FIG. 3 is a cross-sectional view of an article faced on both surfaces with a coated fibrous mat.

FIG. 3 is a schematic illustration of an embodiment of a gypsum panel 200 that can incorporate the article construction 100 of FIG. 2 and at least one of the coated fibrous mats of FIG. 1. In this application the term "gypsum panel" or "gypsum wallboard" refers to any product including gypsum, including, but not limited to, gypsum wallboard, dry wall, gypsum board, gypsum lath, and gypsum sheathing. The board 200 includes a first coated fibrous mat 250 and a second coated fibrous mat 270. The first coated fibrous mat 250 resides on a first major surface 266 of a gypsum board core 260, and the second coated fibrous mat 270 resides on a second major surface 264 of the gypsum board core 260. The first coated fibrous mat 250 includes a first fibrous mat 212 and a first coating layer 218, and the second coated fibrous mat 270 includes a second fibrous mat 213 and a second coating layer 228. Fibers 220 extend from the first fibrous mat 212 into the first coating layer 218, while fibers 222 extend from the first fibrous mat 212 into the gypsum board core 260. Fibers 224 extend from the second fibrous mat 213 into the second coating layer 228, while fibers 225 extend from the second fibrous mat 213 into the gypsum board core 260.

In some embodiments, the gypsum board 300 can optionally include one or more top coatings 280 on the outwardly facing surfaces and overlying the coating layers 218, 228. The top coatings 280 can be applied to enhance resistance to environmental degradation from, for example, staining, moisture, air and/or UV radiation.

While various coating compositions that may be used to form the coating layer of the coated articles are described in more detail herein, in certain embodiments, a coated fibrous mat include an ultraviolet radiation cured coating layer on a first major surface of a fibrous mat. In one embodiment, a coated gypsum panel includes an ultraviolet radiation-cured coating layer on a first major surface of a gypsum panel having a set gypsum core faced with one or more fibrous mats.

In some embodiments, a coated article further includes an underlying coating layer on the fibrous mat between the coating layer formed from the coating composition and the second major surface of the fibrous mat. That is, a precoat or similar second coating layer may be applied to the fibrous mat prior to application of the coating composition thereto. In certain embodiments, the underlying coating layer is a formed from a different composition that the coating composition.

In embodiments of the coated articles in which two or more coating layers are formed on the fibrous mat, the combined thickness of the coating layers may be less than the approximate thickness of the fibrous mat. For example, the coating layer and the underlying coating layer may have a combined average penetration of the fibrous mat of less than the thickness of the fibrous mat, such as from about 10 percent to about 60 percent of the thickness of the mat, or from about 30 percent to about 50 percent of the thickness of the mat. In embodiments of gypsum panels, an underlying coating layer may be formed on a fibrous mat facer between the coating layer and the gypsum core.

The coating compositions used to form the coating layer can be formulated to provide a number of advantages, including, but not limited to, providing a smoother exterior surface finish than comparable uncoated fibrous mats, providing better protection and resistance to moisture erosion, providing improved flexural strength for the fibrous mats, providing improved liquid water repellency while allowing moisture vapor migration through the fibrous mats, providing enhanced UV protection to prevent yellowing and maintain color fastness of the fibrous mats, and/or providing improved mold growth inhibition.

The coating composition used to form the coating layer should form a durable coating, preferably exterior durable when used in an exterior product, which provides a substantially tack-free, block resistant finish. In this application, exterior durable means that the coating layers derived from the coating composition resist degradation by the elements, including, for example, water and UV exposure, for a time sufficient to allow an exterior cladding to be applied, typically about 6 months to about 1 year. Block resistance refers to the ability of the coatings derived from the coating composition to avoid adhesion to other similarly coated articles when the articles are stacked on top of one another, face-to-back or face-to-face. The term substantially tack-free means that the coatings derived from the coating compositions are not sticky to the touch or prone to excessive dirt pick-up.

The coating compositions used to form the coating layer may vary widely, and may be selected from waterborne coating compositions, solventborne coating compositions, and 100% solids coating compositions curable with radiation (for example, ultraviolet ("UV") radiation curable) or thermal energy.

In some embodiments, suitable polymers for use in the coating composition include latex polymers, water-dispersible polymers, water-reducible polymers, and oil-modified polymers.

Suitable latex polymers include (meth)acrylics, vinyls, polyesters, polyurethanes, polyamides, chlorinated polyolefins, ethylene vinyl acetate, polybutadiene, polyvinylidene, styrene acrylics, vinyl acrylics, vinyl versatic acid esters, styrene/butadiene, epoxy esters, polyureas, polysiloxanes, silicones, fluorinated copolymers, and mixtures or copolymers thereof. Such latex polymers normally contain at least polymeric particles, water, and one or more emulsifiers. The waterborne latex polymer particles may include one or more functional groups capable of reacting with an external crosslinker, and such external crosslinker may also be a part of the disclosed compositions.

Suitable latex polymers are typically stabilized using one or more nonionic or anionic emulsifiers (viz., surfactants), used either alone or together. If desired, the latex polymers may be stabilized with an alkali-soluble polymer. A water-soluble free radical initiator is typically used in the polymerization of a latex polymer. The latex polymer may optionally also be functionalized with olefinic groups or other crosslinkable groups where it is desired to enable the latex polymer to participate in radiation curing.

Exemplary commercially available latex polymers include ALBERDINGK AC 2514, ALBERDINGK AC 25142, ALBERDINGK AC 2518, ALBERDINGK AC 2523, ALBERDINGK AC 2524, ALBERDINGK AC 2537, ALBERDINGK AC 25381, ALBERDINGK AC 2544, ALBERDINGK AC 2546, ALBERDINGK MAC 24, and ALBERDINGK MAC 34 polymer dispersions from Alberdingk Boley, Inc.; AQUAMAC 720 from Hexion Specialty Chemicals; EPS 2538 acrylic latex, EPS 2540 styrene acrylic latex and EPS 2725 acrylic latex emulsions from EPS Corp.; vinyl acrylic emulsions available from Celanese Emulsion Polymers under the trade designation RESYN, such as RESYN 7305; acrylic emulsions available from Rohm and Haas Co. under the trade designations RHOPLEX 3131-LO, RHOPLEX E-693, RHOPLEX E-940, RHOPLEX E-1011, RHOPLEX E-2780, RHOPLEX HG-95P, RHOPLEX HG-700, RHOPLEX HG-706, RHOPLEX PR-33, RHOPLEX TR-934HS, RHOPLEX TR-3349 and RHOPLEX VSR-1050; polymer dispersions available from Rohm and Haas Co. under the trade designations RHO SHIELD 636 and RHOSHIELD 3188; acrylic emulsions available from BASF Resins under the trade designations JONCRYL 538, JONCRYL 1552, JONCRYL 1972, JONCRYL 1980, JONCRYL 1982, JONCRYL 1984 and JONCRYL 8383; acrylic latex polymers available from DSM NeoResins, Inc. under the trade designations NEOCRYL A-1127, NEOCRYL A-6115, NEOCRYL XK-12, NEOCRYL XK-90, NEOCRYL XK-98 and NEOCRYL XK-220, and mixtures thereof.

The disclosed compositions may alternatively or optionally contain a water-dispersible or water-reducible polymer. Exemplary water-dispersible polymers include polyurethanes, polyamides, chlorinated polyolefins, (meth)acrylics, vinyls, polyesters, and mixtures or copolymers thereof. The water-dispersible polymer typically will include as a part of the polymer a group or groups which render the polymer dispersible by itself in water. The water-dispersible polymer may optionally also be functionalized with olefinic groups or other crosslinkable groups where it is desired to enable the water-dispersible polymer to participate in radiation curing.

Exemplary commercially available water-dispersible or water-reducible polymers include acrylic copolymers available from BASF Corporation under the trade designation JONCRYL; water-reducible acrylic resins available from Dow Coating Materials under the trade designation PARALOID WR-97; water-reducible acrylic resin available from Reichhold Inc. under the trade designation AROLON 562-G2-70; waterborne acrylic resins available from Dow under the trade designations MAINCOTE HG-54D and RHOPLEX WL-96; thermoplastic styrene acrylic latex resin available from Momentive Specialty Chemicals Inc. under the trade designation AQUAMAC; thermoplastic styrene-acrylic copolymer emulsions available from Lubrizol Advanced Materials, Inc. under the trade designations CARBOSET CR-760 and CARBOSET CR-765; acrylic and styrene acrylate dispersions available from Scott Bader Inc. under the trade designation TEXICRYL; dispersions available from Scott Bader Inc. under the trade designation TEXIGEL; EPS 6208 water-reducible alkyd resin from Engineer Polymer Solutions, Inc. ("EPS"); water-reducible epoxy resin available from Air Products and Chemicals, Inc. under the trade designation ANCAREZ AR555; water-reducible epoxy resin available from Cytec Industries under the trade designation BECKOPDX EP386W/56WA; EPS 3216 water-reducible polyester resin from EPS; EPS 4213 polyurethane dispersion from EPS; polyurethane dispersion available from Bayer Material Science under the trade designation BAYHYDROL PR 240; and vinylidene chloride copolymer emulsions available from Scott Bader Inc. under the trade designation POLIDENE.

Oil-modified polymers may also be used as latex polymers or if appropriately stabilized as water-dispersible polymers. As used herein, oil-modified polymers include polymers that contain oils or oil based derivatives such as glyceride oils (monoglycerides, diglycerides, and the like), fatty acids, fatty amines, and mixtures thereof. Examples of such oil-modified polymers include alkyds, oil-modified polyurethanes, oil-modified polyamides, oil-modified acrylics, and mixtures or copolymers thereof.

In various embodiments, the coating composition used to form the coating layer contains about 90% to about 30% by weight latex or water-dispersible polymer based on the total weight of the non-volatile components in the coating composition, about 80% to about 35% by weight, or about 70% to about 40% by weight. If a water-dispersible polymer is also employed, it may be present in an amount less than the amount of latex polymer.

In some embodiments, aqueous emulsions such as acrylics, styrene acrylics, and vinyl acrylics have been found to work well in the coating composition. In some embodiments, the polymers and copolymers in these emulsions have a glass transition temperature (Tg) of about −45° C. to about 115° C., and in other embodiments the polymers and copolymers can have glass transition temperatures (Tg) of about 0° C. to about 30° C. In some embodiments, (meth) acryl monomers can be copolymerized with styrene or vinyl monomers, and may be incorporated into coating composition in water-borne or 100% solids form. In some embodiments, the resins range in pH from about 1.5 to about 11, or from about 1.7 to about 10, have particle sizes that range from about 30 to about 400 nanometers, and non-volatile matter ("NVM") ranges from about 21% to about 65%.

Examples include, but are not limited to, acrylic aqueous emulsions available from EPS, under the trade designations EPS 2103, EPS 2111, EPS 2113, EPS 2117, EPS 2257, EPS 2293, EPS 2705, EPS 2708, EPS 2757 and EPS 2772, as well as styrene acrylic aqueous emulsions EPS 2272, EPS 2507, EPS 2510, EPS 2512, EPS 2514, EPS 2526, EPS 2533, EPS 2535, EPS 2537, EPS 2548, EPS 2550, EPS 2561, EPS 2568, EPS 2572, and EPS 2851.

In other embodiments, a variety of 100% solids coating compositions have been found to be useful in the coating compositions used to form the coating layer. Representative 100% solids coating compositions include free-radically curable coating compositions, cationically curable coating compositions, ionically curable and multipart (e.g., two-part) coating compositions. The coating compositions contain one or more reactive monomers, oligomers or polymers, and may be free of or substantially free of volatile solvents or carriers that represent hazardous air pollutants. The compositions may also be free of water, and thus may be more rapidly cured. In various embodiments, these compositions may be cured using radiation (e.g., UV, visible light, or electron beam energy), thermal energy or a combination thereof. Exemplary ultraviolet curable compositions may be found in U.S. Pat. No. 7,553,780. In some embodiments, the coating composition may be fully curable within 1-2 seconds, allowing for rapid curing in in-line manufacturing processes.

Representative free-radically curable coating compositions include at least one and preferably at least two sites of ethylenic unsaturation curable through a free radical-induced polymerization mechanism. Exemplary compositions include those described in U.S. Pat. Nos. 4,600,649, 4,902,975, 4,900,763, 4,065,587, 5,126,394, 6,436,159, 6,641,629, 6,844,374, 6,852,768 and 6,956,079, the disclosures of which are incorporated herein by reference. Representative free-radically curable monomers, oligomers or polymers which may be used in the disclosed method include (meth) acrylates, urethanes, urethane(meth)acrylates, epoxy (meth) acrylates, polyether(meth)acrylates, polyesters, polyester (meth)acrylates, polyester urethanes, silicone (meth) acrylates, cellulosic acrylic butyrates, nitrocellulosic polymers, and blended or grafted combinations thereof. The monomer or monomers may for example represent about 10% to about 85%, about 15% to about 45%, or about 30% to about 45%, by weight of the coating composition. The oligomer or oligomers may, for example, represent about 10% to about 90%, or about 30% to about 50%, by weight of the coating composition. The chosen monomers may for example be selected to alter the rheological characteristics of the curable composition, and may include nonfunctional or polyfunctional (e.g., di- or trifunctional) monomers such as isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxyethoxy)ethyl acrylate, n-lauryl acrylate, 2-phenoxyethyl acrylate, glycidyl methacrylate, glycidyl acrylate, acrylated methytolmelamine, 2-(N,N-diethylamino)-ethyl acrylate, neopentyl glycol diacrylate, alkoxylated neopentyl glycol diacrylate, ethylene glycol diacrylate, hexylene glycol diacrylate, diethylene glycol diacrylate, dipropylene glycol diacrylate, tripropylene glycol diacrylate, tetraethylene glycol diacrylate, pentaerythritol tri-, tetra-, or penta-acrylate, trimethylolpropane triacrylate, alkoxylated trimethylol-propane triacrylate containing, fir example, about 2 to about 14 ethylene or propylene oxide units, Methylene glycol diacrylate, tetraethylene glycol diacrylate, alkoxylated neopentyl glycol diacrylate containing, for example, about 2 to about 14 ethoxy or propoxy units, polyethylene glycol diacrylate, 1,3-butylene glycol diacrylate, 1,4-butanediol diacrylate, 1,6-hexanediol diacrylate, polyethylene glycol diacrylate, corresponding methacrylates or acrylates of the acrylates and methacrylates listed above, and mixtures of any of the above.

Representative cationically polymerizable compositions include epoxides and vinyl ethers. Exemplary epoxides include monomeric, oligomeric or polymeric organic compounds having an oxirane ring polymerizable by ring opening, e.g., aliphatic, cycloaliphatic or aromatic materials having, on average, at least one polymerizable epoxy group per molecule and preferably two or more epoxy groups per molecule, and number average molecular weights from 58 to about 100,000 or more. For example, the epoxides may include materials having terminal epoxy groups (e.g., diglycidyl ethers of polyoxyalkylene glycols) and materials having skeletal oxirane units (e.g., polybutadiene polyepoxides). Representative epoxides include those containing cyclohexene oxide groups such as the epoxycyclohexanecarboxylates typified by 3,4-epoxycyclohexylmethyl-3,4-epoxycyclohexanecarboxylate, 3,4-epoxy-2-methylcyclohexyhnethyl-3,4-epoxy-2-methylcyclohexane carboxylate, and bis(3,4-epoxy-6-methylcyclohexylmethyl) adipate. For a more detailed list of useful cyclohexane oxide epoxides, reference is made to U.S. Pat. No. 3,117,099. Further representative epoxides include glycidyl ether monomers such as the glycidyl ethers of polyhydric phenols Obtained by reacting a polyhydric phenol with an excess of chlorohydrin such as epichlorohydrin (e.g., the diglycidyl ether of 2,2-bis-(2,3-epoxypropoxyphenol)propane). For a more detailed list of useful glycidyl ether epoxides, reference is made to U.S. Pat. No. 3,018,262 and to Lee and Neville, Handbook of Epoxy Resins, McGraw-Hill, New York (1982). Other representative epoxides include octadecylene oxide, epichlorohydrin, styrene oxide, vinyl cyclohexene oxide, vinylcyclohexene dioxide, glycidol, diglycidyl ethers of Bisphenol A (e.g., those available under the trade designations EPON from Resolution Performance Products), epoxy vinyl ester resins (e.g., those available under the trade designations DERAKANE from Dow Chemical Co.), bis(2, 3-epoxycyclopentyl) ethers, aliphatic epoxies modified with polypropylene glycol, dipentene dioxides, poxidized polybutadienes, silicone resins containing epoxy functionality, epoxy silanes (e.g., beta-(3,4-epoxycyclohexyl)ethyltrimethoxy silane and gamma-glycidoxypropyltrimethoxy silane, flame retardant epoxy resins, 1,4-butanediol diglycidyl ethers, polyglycidyl ethers of phenolformaldehyde novolaks, and resorcinol diglycidyl ethers. Other representative cationically-polymerizable materials and cationically/free radically polymerizable materials include those listed in U.S. Patent Application Publication No. US 2006/0029825, the disclosure of which is incorporated herein by reference. Preferred low viscosity oligomers include polyethers, polyesters, alkoxylated polyepoxy acrylates, aliphatic polyepoxy acrylates, or urethane acrylates and mixtures thereof.

In some embodiments; the coating composition is an epoxy acrylate, a polyester; or a thermoplastic acrylic.

Additional exemplary coating compositions include those described in U.S. Pat. Nos. 4,555,545 and 6,887,937.

The disclosed 100% solids coating compositions used to form the coating layer optionally may contain a photoinitiator to facilitate curing. Radiation curable compositions that do not contain photoinitiators may be cured using electron beam radiation. Exemplary photoinitiators for free-radically curable compositions include benzophenone, benzoin, acetophenone, benzoin methyl ether, Michler's ketone, benzoin butyl ether, xanthone, thioxanthone, propiophenone, fluorenone, carbazole, diethoxyacetophenone, 1-hydroxy-cyclohexyl phenyl ketone, the 2-, 3- and 4-methylacetophenone and methoxyacetophenone, the 2- and 3-chloroxanthones and chlorothioxanthone, 2-acetyl-4-methylphenyl acetate, 2,2'-dimethoxy-2-phenylacetophenone, benzaldehyde, fluorene, anthraquinone, triphenylamine, 3- and 4-allyl-phenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butyl-benzophenone, isobutyl ether, benzoic acetate, benzil, benzilic acid, amino benzoate, methylene blue, 2,2-diethoxyacetophenone, 9,10-phenanthrenequinone, 2-methyl anthraquinone, 2-ethyl anthraquinone, 1-tert-butyl-anthraquinone, 1,4-naphthoquinone, isopropylthioxanthone, 2-chlorothioxanthone, 2-iso-propylthioxanthone, 2-methylthioxanthone, 2-decylthioxanthone, 2-dodecyl-thioxanthone, 2-methyl-1-[4-(methyl thio)phenyl)]-2-morpholinopropanone-1, combinations thereof and the like. Exemplary photoinitiators for cationically polymerizable compositions include arylsulfonium salts such as those described in U.S. Pat. Nos. 4,161,478 and 4,173,476, and ferrocenium salts such as IRGACURE 261, commercially available from Ciba Specialty Chemicals. Exemplary photoinitiators for radiation, e.g., UV, curing polymerizable of pigmented compositions include IRGACURE 819, IRGACURE 907, IRGACURE 369, IRGACURE 1800, IRGACURE, 1850, or TPO (diphenyl (2,4,6-trimethylbenzoyl)-phosphine oxide), and the like.

The photoinitiator or combination of photoinitiators typically will be present in the coating composition in amounts from about 0.5% to about 15%, about 1% to about 9%, or about 1% to about 5%, by weight of the coating composition.

In various embodiments, the coating composition used to form the coating layer may also include a wide range of additives including, but not limited to, water, glass, paper or wood fibers, mineral fillers, strength additives, accelerators, retarders, crystallized gypsum particles, dispersants, fire retarders, water absorbers, water repellants, mold inhibitors, UV light resistant compounds, pH adjusters, rheology modifiers, flow control agents, defoamers, and the like.

Thickeners may include hydroxyethyl cellulose; hydrophobically modified ethylene oxide urethane; processed attapulgite, a hydrated magnesium aluminosilicate; and other thickeners known to those of ordinary skill in the art. For example, thickeners may include CELLOSIZE QP-09-L and ACRYSOL RM-2020NPR, commercially available from Dow Chemical Company (Philadelphia, Pa.); and ATTAGEL 50, commercially available from BASF Corporation (Florham Park, N.J.).

Surfactants may include sodium polyacrylate dispersants, ethoxylated nonionic compounds, and other surfactants known to those of ordinary skill in the art. For example, surfactants may include HYDROPALAT 44, commercially available from BASF Corporation; and DYNOL 607, commercially available from Air Products (Allentown, Pa.).

Defoamers may include multi-hydrophobe blend defoamers and other defoamers known to those of ordinary skill in the art. For example, defoamers may include FOAMASTER SA-3, commercially available from BASF Corporation.

Fillers may include inorganic, mineral fillers, such as sodium-potassium alumina silicates, microcrystalline silica, talc (magnesium silicate), and other fillers known to those of ordinary skill in the art. For example, fillers may include MINEX 7, commercially available from the Cary Company (Addison, Ill.); IMSIL A-10, commercially available from the Cary Company; and TALCRON MP 44-26, commercially available from Specialty Minerals Inc. (Dillon, Mont.).

Biocides may include broad-spectrum microbicides that prohibit bacteria and fungi growth, antimicrobials such as those based on the active diiodomethyl-ptolylsulfone, and other compounds known to those of ordinary skill in the art. For example, biocides may include KATHON LX 1.5%, commercially available from Dow Chemical Company, POLYPHASE 663, commercially available from Troy Corporation (Newark, N.J.), and AMICAL Flowable, commercially available from Dow Chemical Company. Biocides may also act as preservatives.

UV absorbers may include encapsulated hydroxyphenyltriazine compositions and other compounds known to those of ordinary skill in the art, for example, TINUVIN 477DW, commercially available from BASF Corporation.

Transfer agents such as polyvinyl alcohol (PVA) and other compounds known to those of ordinary skill in the art may also be included in the coating composition. These additives are optionally present in the coating composition up to about 5 wt %, or at about 0.01 wt % to about 2 wt %, or about 0.1 wt % to about 1 wt %, based on the total weight of the coating composition.

The 100% solids coating compositions used to form the coating layer may include a variety of adjuvants including mineral fillers, dispersants, dyes, extenders, surfactants, defoamers, flow control agents, fire-retarders, water-repellancy additives, mold inhibitors, UV-resistant compounds, pH adjusters, rheology modifiers, pigments, waxes, solvents (preferably solvents that do not represent hazardous air pollutants), adhesion promoters, slip agents, release agents, optical brighteners, light stabilizers and antioxidants. The additives are typically present in the coating compositions at 0.01 wt % to about 3 wt %, or about 0.1 wt % to 1 wt %, or about 0.1 wt % to 0.5 wt % and should not be present at a level that will adversely impact the hydrophobicity or adhesion of the coating layers. The types and amounts of such adjuvants will be apparent to those skilled in the art. Those skilled in the art will also appreciate that due to normal differences in application equipment, application conditions, substrates and quality requirements at different end user sites, adjustments will usually be made in the types and amounts of such adjuvants to tailor a coating composition to a particular end user.

Natural or synthetic, organic or inorganic, pigments may also be used in the coating composition. For example, pigments that can be used in the coating compositions used to form the coating layer include, but are not limited to, titanium dioxide white, carbon black, lampblack, black iron oxide, red iron oxide, transparent red oxide, yellow iron oxide, transparent yellow oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as monoazo yellow) and mixtures thereof. In another embodiment, the coating compositions used to form the coating layer include a water repellency or hydrophobing agent to increase the resistance of the coating to liquid water intrusion as measured by the Cobb ring test method. In this embodiment, the hydrophobing agent can be present in the coating composition at about 0.01 wt % to about 9 wt %, or about 0.25 wt % to about 2 wt %, or about 0.25 wt % to about 0.5 wt %, based on the total weight of the composition. Suitable hydrophobing agents include, but are not limited to, siloxane additives under the trade designation Tego from Evonik, such as Tegophobe 1401 (amino functional polysiloxane) and Tegophobe 1650 (modified polysiloxane resin). Other suitable hydrophobing agents include but are not limited to natural and paraffin waxes such as Aquabead 325E (paraffin wax emulsion) and Aquabead 525E (natural and paraffin wax) available from Micro Powders, Inc and wax emulsions available from Engineered Polymer Solutions, Minneapolis, Minn., under the trade designations QPM100.

Methods of making coated articles may generally include applying a coating composition to a first major surface of a fibrous mat and applying radiation to the fibrous mat to at least harden or cure the coating composition to form a coating layer at the first major surface of the fibrous mat, such that a portion of the fibers forming second major surface of the mat are uncoated. For example, the coating composition may be applied to a fibrous mat before the mat is combined with a gypsum slurry to form a panel, or the coating composition may be applied to a fibrous mat that is part of an already formed gypsum panel, as described in more detail herein.

As used herein, the term "uncoated" when used to describe a portion of fibers forming a major surface opposite the coated surface refers to the fibers being uncoated by the coating composition that forms the coating layer. For example, the fibers of the second major surface may be coated by a gypsum slurry. In embodiments, the coating composition is an ultraviolet curable composition and the method also includes applying radiation to the fibrous mat to at least partially cure the composition. As described in more detail below, the coating composition may be applied to the fibrous mat by various suitable coating application techniques, including, but not limited to, slot coating, curtain coating, roll coating, or release coating. A doctor blade or similar equipment may be used to remove excess coating composition from the fibrous mat and/or to further control the application of the coating composition to the fibrous mat. In some embodiments, a doctor blade is used in combination with a particular application technique, such as a roll coating technique, to achieve the precise coating thickness and penetration of the coating layer.

In certain embodiments, the coating composition is applied to the major surface of the fibrous mat that forms the underside, or floor-facing side, of the mat. Such application may assist in controlling the level of penetration of the coating composition into the fibrous mat.

In certain embodiments, the coating composition has a particular viscosity to allow for the desired coating penetration and coverage.

Figure 4A:
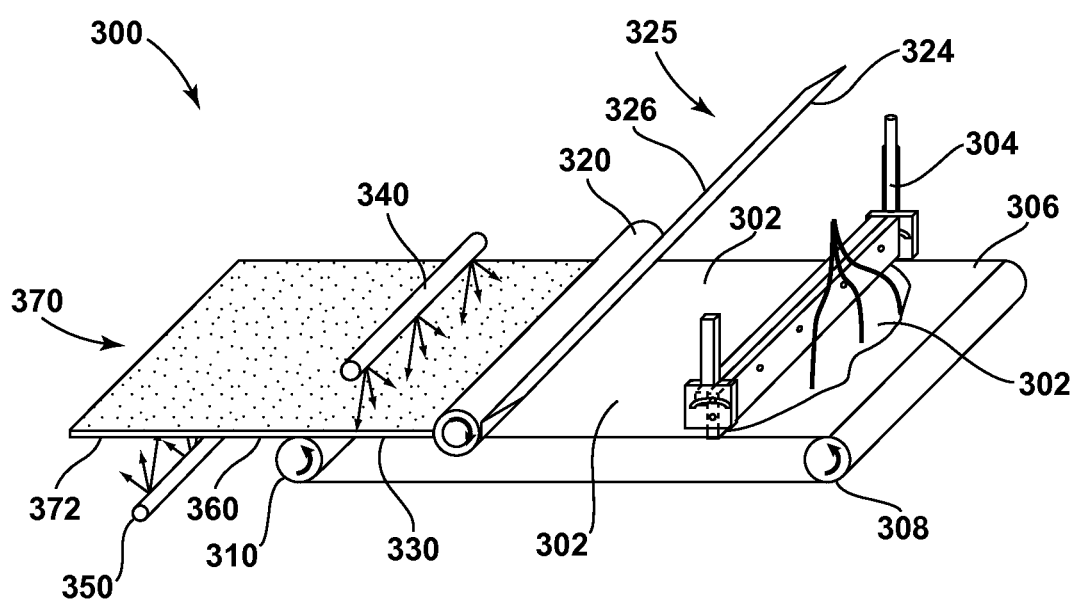
FIG. 4A is a schematic diagram of an embodiment of a process for making the coated fibrous mat of FIG. 1.

FIG. 4A is a schematic representation of an embodiment of a method and apparatus 300 for manufacturing the coated fibrous mat of FIG. 1 via release coating. In FIG. 4A, a layer of a coating composition 302 is deposited, such as by a coater 304, on a carrier material 306 moving in a roll-to-roll fashion between an arrangement of rollers 308, 310. The coater 304 may deposit the layer 302 of the coating composition in any commercially useful manner, including, but not limited to, roll coating, airless spraying, curtain coating, die coating, slot coating, and the like.

The carrier material 306 can be selected from any film-like material that allows full release of a coating produced by at least partially curing or hardening the layer 302 of the polymeric coating composition. Suitable carrier materials include, but are not limited to, metal films, silicone rubber, or carriers such as polymeric films, fiberglass or fabric coated with release materials such as those available from E.I. DuPont, Wilmington, Del., under the trade designation TEFLON, parchment paper, coated papers such as wax release paper, and the like. In certain embodiments, the carrier material is in the form of a belt or roll onto which the coating composition may be deposited.

Referring again to FIG. 4A, a mat roller 320 brings a first major surface 324 of fibrous mat 325 into contact with the coating layer 302. The fibrous mat 325 may be made of any woven or non-woven fibrous material including, but not limited to, paper, fiberglass, polymeric materials, metals, cellucose, ceramic materials, carbon and combinations thereof. In some embodiments, the fibrous mat 325 is a non-woven material, which in this application refers to a sheet or web structure bonded together by entangling fiber or filaments (or by perforating films) mechanically, thermally or chemically. In some embodiments, the non-wovens are flat or tufted porous sheets that are made directly from separate glass fibers, molten plastic or plastic film. The non-wovens do not require weaving or knitting, and the fibers in the non-wovens need not be converted to yarn. In one embodiment, a suitable non-woven fiberglass mat is commercially available from Johns-Manville.

When the first major surface 324 of the fibrous mat 325 contacts the coating layer 302, the first major surface 324 of the fibrous mat 325 becomes at least partially embedded in the coating composition, and the fibers proximal the first major surface 324 become entangled and coated with the coating composition. A coating layer 330 forms at the first major surface 324 of the fibrous mat 325 and the second major surface 326 of the fibrous mat 325 has an uncoated portion of mat fibers. In some embodiments, the coating layer 330 has a thickness $t_1$ less than the thickness t of the fibrous mat 325 (see FIG. 1). That is, the coating layer 330 may have an average penetration of the fibrous mat 325 of less than the thickness t of the fibrous mat 325, such as from about 10 percent to about 60 percent of the thickness of the fibrous mat, or from about 30 percent to about 50 percent of the thickness of the fibrous mat.

After the fibers at or near the first major surface 324 of the fibrous mat 325 become embedded in in the coating layer 330, in one embodiment, the coating composition is at least partially cured or hardened at a first curing stage 340 by applying at least one of thermal energy or radiation (for example, ultraviolet (UV) light, electronic beams, and the like) on the second major surface 326 such that the radiation passes through the non-woven material of the fibrous mat 325. In another embodiment, the coating composition is at least partially cured or hardened by applying thermal energy or radiation through the carrier material 306.

In some embodiments, the coating layer 330 is fully hardened at the first curing stage 340, or the coating layer 330 may be partially hardened (B-staged) at the first coating station 340 and fully hardened at a second curing stage 350 by applying at least one of thermal energy or radiation to the coating layer 330.

In the schematic illustration of FIG. 4A, the locations of the first and the second stages 340, 350 are merely provided as examples. The location and design of the coating, curing, and drying stations in the conveyor system 300 may vary widely, and additional stations may be added in multiple locations as needed.

Referring again to the embodiment of FIG. 4A, at a point 360 downstream of the roller 310 and the first curing station 340, the carrier material 306 is separated from the coating layer 330 and a coated fibrous mat 370 is removed from the conveyor system 300. As discussed above with reference to FIG. 1, the coated fibrous mat 370 includes an at least partially hardened coating layer 372 on a major surface thereof that is continuous or discontinuous, and can be porous or non-porous. The coating layer 372 has a thickness that is easily controllable, and the presence of the carrier material 306 during the coating and curing steps may prevent fibers in the fibrous mat 325 from extending beyond the coating layer 372.

After the coated fibrous mat 370 is removed from the conveyor system 300, either or both major surfaces of the coated fibrous mat 370 may optionally be further exposed to at least one of thermal energy or radiation to further harden or alter the properties of the hardened coating layer 372. In some embodiments, the coating layer has a Gurley porosity of from about 1 to about 60 seconds. In certain embodiments, the coating layer has a Gurley porosity of from about 10 to about 20 seconds. For gypsum board production, such porosity advantageously allows water to evaporate from the board core as it sets, via the coating. Production of other structural laminates (for example, polyisocyanate foam board) may require a lower porosity. For example, for gypsum board production the coating layer may have a porosity of 1 second or greater for the movement of 300 mL of air as measured on the Gurley densometer.

The second major surface 326 of the fibrous mat 325 opposite the coating layer 372 may subsequently be further coated with another layer, such as is necessary to make an article construction (FIG. 2). In one embodiment, a slurry including gypsum particles, water, and optional additives (herein referred to as a "gypsum slurry") may be deposited on the second major surface 326 of the fibrous mat 325 and opposite the coating layer 372. An uncoated major surface of a second wallboard construction is applied over the gypsum-containing layer, which can be subsequently dried to form a gypsum wallboard as exemplified in FIG. 3 above.

In one embodiment, a gypsum slurry is deposited on the second major surface of the fibrous mat in an in-line process with the coating composition application and the composition hardening/curing process. In other embodiments, the coated fibrous mat is formed into a roll of fibrous mat, which may then be used as a feed roll for an off-line gypsum panel manufacturing process, such as illustrated in FIG. 24.

Figure 24:
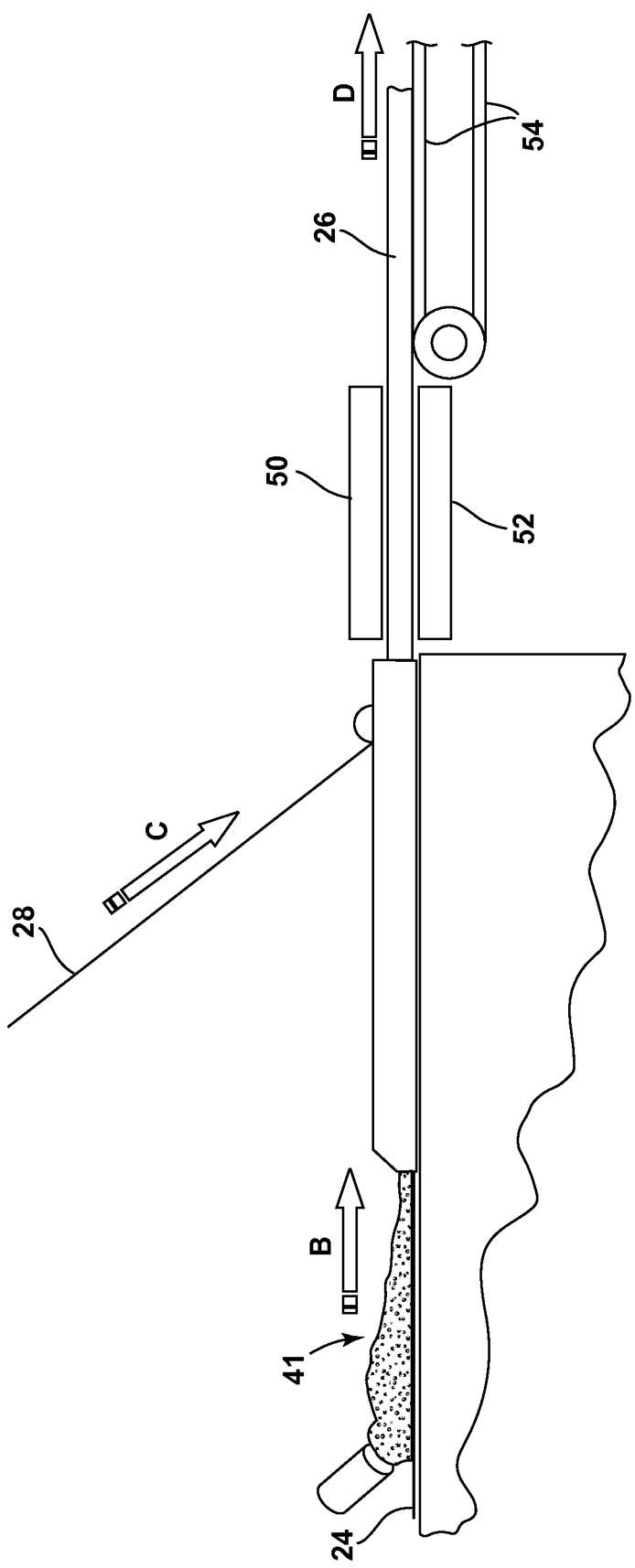
FIG. 24 is a schematic diagram of a gypsum panel manufacturing process.

With reference to FIG. 24, fibrous mat 24 is fed from a roll (not shown), and if pre-coated, with the coated side down. Fibrous facing material 24 receives the gypsum slurry 41 and moves in the direction of arrow B. Fibrous mat 28 is applied to the gypsum slurry 41 deposited thereon. A second fibrous mat 28 is applied to the gypsum slurry from a roll, in the direction of arrow C, such that the two fibrous mats 24, 28 sandwich the gypsum slurry 41 therebetween. The sandwich structure may then be pressed to the desired thickness between plates 50 and 52. The continuous sandwich of slurry and applied facing mats then is carried by conveyor 54 in the direction of arrow D. The slurry sets to form a gypsum panel structure 26 as it is carried along and may travel through an oven to expedite setting of the slurry. The continuous gypsum panel structure may then be cut into the desired panel dimensions.

In another embodiment, a supplementary coating composition may be applied to the at least partially hardened coating layer 372 during the article manufacturing process to enhance the environmental resistance of the article construction, or may be applied as a topcoat layer on the coating layer 372 after the article manufacturing process is complete. Examples of suitable supplementary coating compositions include any of the coating compositions described above, and further include, but are not limited to, those described in U.S. Pat. Nos. 8,092,858 and 7,553,780, and U.S. Published Patent Application No. US2009/0223618.

Figure 4B:
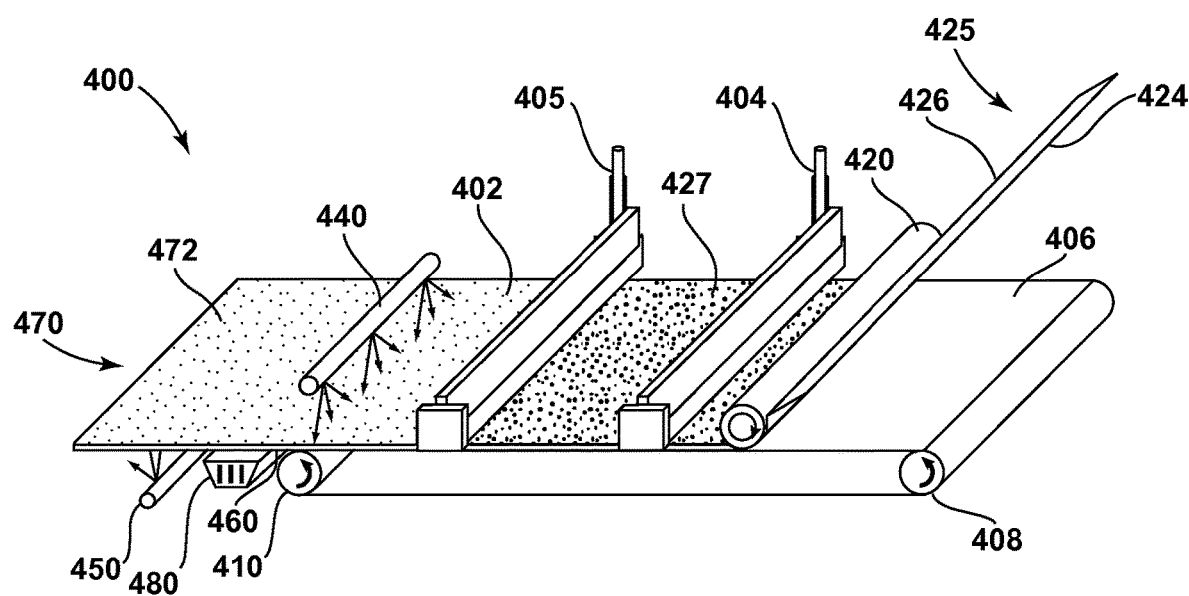
FIG. 4B is a schematic diagram of another embodiment of a process for making the coated fibrous mat of FIG. 1.

FIG. 4B is a schematic representation of another embodiment of a method and apparatus 400 for manufacturing the polymeric coated fibrous mat of FIG. 1. In this method a filler liquid is applied to the fibrous mat to displace a predetermined volume of the air resident between the fibers of the mat. A coating composition immiscible with the filler liquid is then applied to a major surface of the mat, displaces the air remaining within the mat, and occupies the remaining volume available within the fibrous mat. The applied coating composition "floats on" the filler liquid and remains near the major surface of the mat until the coating composition is hardened using radiation or thermal energy to form a coating layer. The filler liquid may subsequently be removed, leaving the coating layer to occupy a volume of the mat near the surface.

In the embodiment of FIG. 4B, a mat roller 420 brings a first major surface 424 of a fibrous mat 425 into contact with a carrier material 406 moving in a roll-to-roll fashion between an arrangement of rollers 408, 410. The carrier material 406 may be selected from any of the carrier materials described above in the discussion of FIG. 4A.

A filler liquid is then applied to the fibrous mat 425 to displace a predetermined volume of the air resident between the mat fibers. In various embodiments, sufficient filler liquid is applied to the mat to displace at least about 95%, or about 90%, or about 80%, or about 70%, or about 50%, of the volume of air resident within the mat, leaving the remaining volume available to be occupied by a subsequently applied coating layer. The filler liquid may be applied to the fibrous mat 425 in a number of different ways. For example, in the embodiment of FIG. 4A a first coater 404 applies a filler liquid to a second major surface 426 of the fibrous mat 425 to create a liquid-saturated fibrous mat 427. The first coater 404 may deposit the filler liquid on the fibrous mat 425 in any commercially useful manner, including, but not limited to, direct roll coating, flood coating, airless spraying, curtain coating, die coating, slot coating, and the like. In another embodiment not shown in FIG. 4B, the filler liquid may be applied to the carrier material 406 upstream of the first coater 404 and prior to or at the same time the fibrous mat 425 contacts the carrier material 406.

Referring again to the embodiment of FIG. 4B, a second coater 405 then deposits a layer 402 of a coating composition, which may be selected from any of the coating compositions described above, on the second major surface 426 of the liquid-saturated fibrous mat 427. The second coater 405 may deposit the layer 402 of the coating composition in any commercially useful manner, including, but not limited to, direct roll coating, airless spraying, curtain coating, die coating, slot coating, and the like.

The filler liquid applied by the first coater 404 may be selected from any liquid that is immiscible with the coating composition applied by the second coater 405 to form the coating layer 402. The filler liquid resides between the fibers of the liquid-saturated fibrous mat 425 during application of the coating composition by the second coater 405, which limits the free volume of the liquid-saturated fibrous mat 425 that may be accessed by the coating composition during the coating process at the second coater 405. The filler liquid controls the depth of penetration of the coating composition into the second major surface 426 of the liquid-saturated fibrous mat 427, which in turn limits the thickness of the coating layer 402 formed on the second major surface 426 (see thickness $t_1$ in FIG. 1). A wide variety of filler liquids may be used, and in some embodiments the filler liquid is an aqueous solution or water. In some embodiments, the filler liquid may optionally include a surfactant to more completely wet the fibers of the liquid-saturated fibrous mat 427. Suitable surfactants for use in the filler liquid include, but are not limited to, those available under the trade designation Dynol 607 from Air Products (Allentown, Pa.) and those available under the trade designation Rhodasurf DA-639 from Solvay (Newark, N.J.).

After the layer 402 of the coating composition forms on the second major surface 426 of the liquid-saturated fibrous mat 427, the fibers proximal to the second major surface 426 become embedded, tangled and substantially fully coated with the coating composition. The coating layer 402, which is formed of polymeric materials immiscible with the filler liquid in the liquid-saturated fibrous mat 427, is concentrated on the second major surface 426 and has a thickness $t_1$ less than the thickness t of the fibrous mat 425 (see FIG. 1). That is, the coating layer has an average penetration of the fibrous mat of less than a thickness of the fibrous mat.

After the fibers at or near the second major surface 426 of the liquid-saturated fibrous mat 427 become embedded in in the coating layer 402, in one embodiment, the layer 402 is at least partially cured or hardened at a first curing stage 440 by applying at least one of thermal energy or radiation (for example, ultraviolet light (UV), electronic beams, and the like) on the second major surface 426. In some embodiments, the coating layer 402 is fully hardened at the first curing stage 440 to form a hardened coating layer 472 extending between the second major surface 426 and the interface between the filler liquid and the coating composition, or the coating layer 402 may be partially hardened (B-staged) at the first coating station 440 and fully hardened at a second curing stage 450 to form the hardened coating layer 472 on the second major surface 426 by applying at least one of thermal energy or radiation to the first major surface 424 and through the fibers of the fibrous mat 425. In the schematic illustration of FIG. 4B, the locations of the first and the second stages 440, 450 are merely provided as examples. The location of the coating, curing, and drying stations in the conveyor system 400 may vary widely, and additional stations may be added in multiple locations as needed.

Referring again to the embodiment of FIG. 4B, at a point 460 downstream of the roller 410 and the first curing station 440, the carrier material 406 releases from the first major surface 424 of the liquid-saturated fibrous mat 427. The liquid-saturated fibrous mat 427 is then dried at a water removal station 480 to remove the filler liquid. Any suitable technique may be used at the water removal station 480 to remove the filler liquid including, for example, vacuuming, thermal drying in an oven, and the like. The drying temperature selected to evaporate the filler liquid may vary widely, and in some embodiments a drying temperature of about 150° F. to about 300° F. (65° C. to 150° C.) may be used.

After the water is removed from the liquid-saturated fibrous mat 427, a coated fibrous mat 470 is removed from the conveyor system 400. As discussed above, the coated fibrous mat 470 includes a coating layer 472 on a major surface thereof that is continuous or discontinuous, and can be porous or non-porous. The coating layer 472 has a thickness that is easily controllable, because the filler liquid displaces the air within the fibrous mat and limits the volume of the fibrous mat available to the coating composition.

As discussed above with respect to FIG. 4A, the coated fibrous mat 470 may optionally be further exposed to at least one of thermal energy or radiation to further harden or alter the properties of the coating layer 472 thereon.

The first major surface 424 of the fibrous mat 425 opposite the coating layer 472 may subsequently be further coated with another layer as necessary to make an article construction (FIG. 2). In one embodiment, a gypsum slurry is deposited on the first major surface 424 of the fibrous mat 425 and opposite the coating layer 472. An uncoated major surface of a second wallboard construction is applied over the gypsum-containing layer, which can be subsequently dried to form a gypsum wallboard as exemplified in FIG. 3 above.

In one embodiment, a gypsum slurry is deposited on the second major surface of the fibrous mat in an in-line process with the filler liquid and coating composition application processes and with the composition hardening/curing process. In other embodiments, the coated fibrous mat is formed into a roll of fibrous mat, which may then be used as a feed roll for an off-line gypsum panel manufacturing process.

In another embodiment, a supplementary coating composition may be applied to the at least partially hardened coating layer 472 during the wallboard manufacturing process to enhance the environmental resistance of the wallboard construction, or may be applied as a topcoat layer on the coating layer 472 after the wallboard manufacturing process is complete.

In certain embodiments, a method of making a coated article includes applying a coating composition, such as an ultraviolet curable composition, to a first major surface of a fibrous mat containing a plurality of mat fibers, and hardening or curing the coating composition, such as by applying radiation to the fibrous mat, to form a coating layer at the first major surface of the fibrous mat. The second major surface of the fibrous mat opposite the first major surface includes an uncoated portion of the plurality of mat fibers (i.e., the mat fibers at the second major surface are not coated by the coating composition). In some embodiments, the coating layer has an average penetration of the fibrous mat of less than the thickness of the fibrous mat, such as from about 10 percent to about 60 percent of the thickness, or from about 30 percent to about 50 percent of the thickness.

Figure 4C:
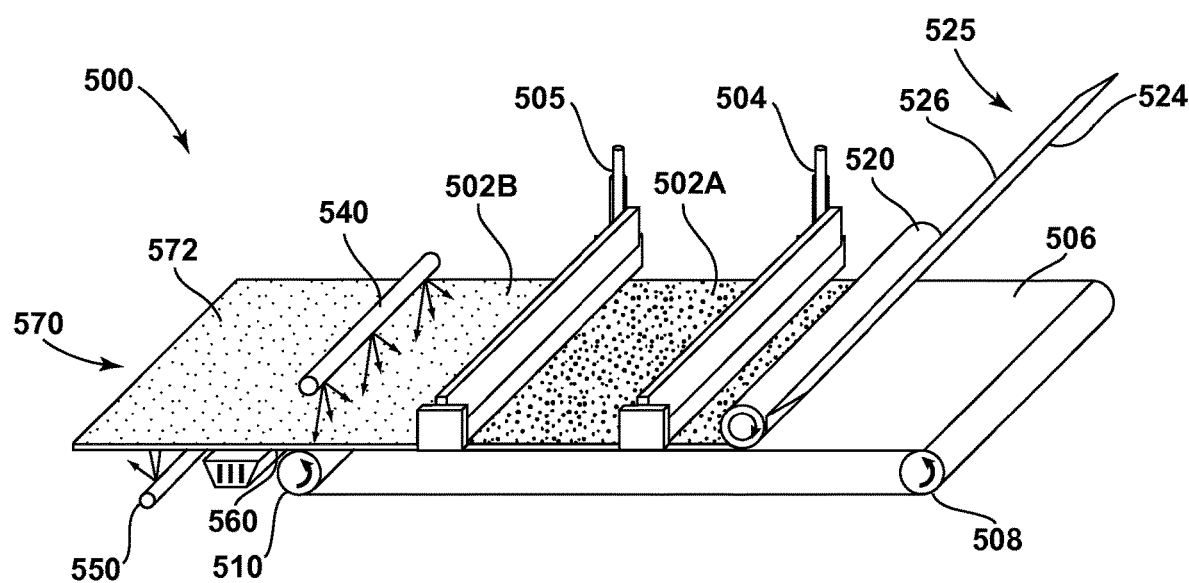
FIG. 4C is a schematic diagram of yet another embodiment of a process for making the coated fibrous mat of FIG. 1.

FIG. 4C is a schematic representation of another embodiment of a method and apparatus 500 for manufacturing the coated fibrous mat of FIG. 1. In FIG. 4C, a mat roller 520 brings a second major surface 524 of a fibrous mat 525 into contact with an optional carrier material 506 (such as a roller or belt) moving in a roll-to-roll fashion between an arrangement of rollers 508, 510. The carrier material 506 may be selected from any of the carrier materials described above in the discussion of FIGS. 4A-4B, which are releasable from the fibrous mat 425 and any subsequently applied coating layers.

A coater 505 applies a coating layer 502B of a coating composition to the first major surface 526 of the fibrous mat 525. The coater 505 may deposit the coating layer 502B of the coating composition in any commercially useful manner, including, but not limited to, roll coating, airless spraying, curtain coating, die coating, slot coating, and the like. The coating composition used to form the coating layer 502B may be selected from any of the coating compositions described above.

After the coating layer 502B forms on the first major surface 526 of the fibrous mat 525, the fibers proximal to the first major surface 526 of the fibrous mat become embedded, tangled and substantially fully coated with the coating composition. The coating layer 502B is disposed at the first major surface 526 of the fibrous mat 525, and the thickness of the coating layer 502B is less than the thickness of the fibrous mat 525.

In one embodiment the coating layer 502B is at least partially cured or hardened at a first curing stage 540 by applying at least one of thermal energy or radiation (for example, UV, electronic beams, and the like) on the coating layer 502B. In some embodiments, the coating layer 502B is fully hardened at the first curing stage 540 to form a hardened coating layer 572 on the first major surface 526 of the fibrous mat 525, or the coating layer 502B may be partially hardened (B-staged) at the first coating station 540 and fully hardened at a second curing station 550 to form the hardened coating layer 572 on the first major surface 526 by applying at least one of thermal energy or radiation to the second major surface 524 and through the fibers of the fibrous mat 525. For example, the thermal energy or radiation may be applied through the optional carrier material. In the schematic illustration of FIG. 4C, the locations and designs of the first and the second stages 540, 550 are merely provided as examples. The locations and designs of the coating, curing, and drying stations in the conveyor system 500 may vary widely, and additional stations may be added in multiple locations as needed.

Referring again to the embodiment of FIG. 4C, at a point 560 downstream of the roller 510 and the first curing station 540, the optional carrier material 506 is separated from the second major surface 524 of the fibrous mat 425. The fibrous mat 425 may then optionally be further dried at a drying station 580 using any suitable drying technique such as, for example, vacuuming, thermal drying in an oven, and the like. The drying temperature selected to dry the fibrous mat 525 at the drying station 580 may vary widely, and in some embodiments a drying temperature of about 150° F. to about 300° F. (65° C. to 150° C.) may be used.

After the coating layer 502B is fully hardened, the coated fibrous mat 570 is removed from the conveyor system 500. As discussed above, the coated fibrous mat 570 includes a coating layer 572 on a major surface thereof that is continuous or discontinuous, and can be porous or non-porous. The coating layer 572 has a thickness that is easily controllable, and the presence of the coating layer 502B on the first major surface of the fibrous mat 525 prevents fibers in the fibrous mat 525 from extending through the coating layer 572. As discussed above with respect to FIGS. 4A-4B, the coated fibrous mat 570 may optionally be further exposed to at least one of thermal energy or radiation to further harden or alter the properties of the coating layer 572 thereon.

Figure 16A:
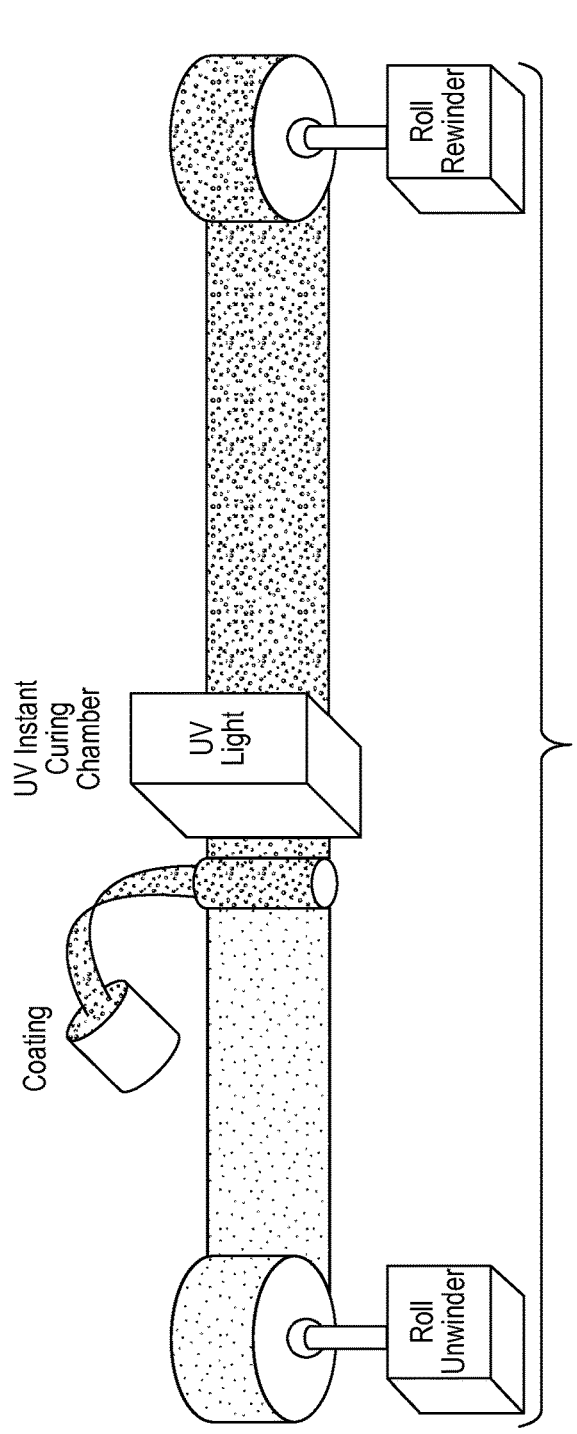
FIG. 16A is a schematic diagram on an off-line process for making coated fibrous mats.

The second major surface 524 of the fibrous mat 525 opposite the coating layer 572 may subsequently be further coated with another layer as necessary to make an article construction (FIG. 2). In one embodiment, a gypsum slurry including may be applied on the second major surface 524 of the fibrous mat 525 and opposite the coating layer 572. In one embodiment, a gypsum slurry is deposited on the second major surface of the fibrous mat in an in-line process with the coating composition application and the composition hardening/curing process. In other embodiments, as illustrated in FIG. 16A, the coated fibrous mat is formed into a roll of fibrous mat, which may then be used as a feed roll for an off-line gypsum panel manufacturing process.

For example, an uncoated major surface of a second article construction (e.g., a second coated fibrous mat) may be applied over the gypsum layer, which can be subsequently dried to form a gypsum board as exemplified in FIG. 3 above. In another embodiment, a layer of liquid polyisocyanate may be applied on the second major surface 524 of the fibrous mat 525 and opposite the coating layer 572. An uncoated major surface of a second article construction (e.g., a second fibrous mat) is applied over the polyisocyanate layer before the start of the exothermic reaction and before entering a board forming apparatus in which the polyisocyanate will expand and form a foam that is set to a predefined thickness within the apparatus. In this embodiment the porosity of the coating layer 572 is sufficiently low such that the liquid does not pass completely through the mat.

In another embodiment, a supplementary coating composition may be applied to the at least partially hardened coating layer 372 during the article manufacturing process to enhance the environmental resistance of the article, or may be applied as a topcoat layer on the coating layer 372 after the article manufacturing process is complete.

In some embodiments, an optional secondary coater 504 applies an underlying coating layer 502A of a first coating composition to a first major surface 526 of the fibrous mat 525 prior to application of the coating layer 502B thereto. That is, coating layer 502B may be applied over the underlying coating layer 502A of the first coating composition. The optional secondary coater 504 may deposit the first coating composition on the fibrous mat 425 in any commercially useful manner, including, but not limited to, roll coating, flood coating, airless spraying, curtain coating, die coating, slot coating, and the like. The first coating composition used to form the underlying coating layer 502A may be selected from any of the coating compositions described above, and may be the same or different from the coating composition used to form the coating layer 502B on the first major surface 526 of the fibrous mat 525.

In some embodiments, for example, the first coating composition used to form the underlying coating layer 502A is a waterborne coating composition, while the coating composition used to form the coating layer 502B is a 100% solids radiation curable (for example, UV curable or microwave curable) coating composition. In some embodiments, the coating layer 502B may be formed by applying the coating composition over the underlying coating layer 502A while the underlying coating layer 502A is still wet, although the underlying coating layer 502A may optionally be at least partially dried, such as by thermal energy, prior to application of the coating composition to form the coating layer 502B.

While not wishing to be bound by any theory, presently available evidence indicates that the underlying coating layer 502A substantially fills the voids in the first major surface 526 of the fibrous mat 525. In some embodiments the presence of the first coating layer 502A enables subsequent application of a coating layer 502B that is relatively thin compared to the underlying coating layer 502A. In some embodiments the underlying coating layer 502A creates a more uniform substrate for the coating layer 502B, which can allow the coating layer 502B to be applied at lower thickness because the gaps that must be spanned by the coating layer 502B are smaller compared to the wide gaps between the fibers of the uncoated fibrous mat 525.

In some embodiments, the coating layer and the underlying coating layer have a combined average penetration of the fibrous mat of less than the thickness of the fibrous mat, such as from about 10 percent to about 60 percent of the thickness, or from about 30 percent to about 50 percent of the thickness.

After the coating layer 502B forms on the first coating layer 502A, the fibers proximal to the first major surface 526 of the fibrous mat become embedded, tangled and substantially fully coated with the first and the second coating compositions. The underlying coating layer 502A and the coating layer 502B are concentrated on the first major surface 526 of the fibrous mat 525, and the combined thickness of the coating layers 502A and 502B is less than the thickness of the fibrous mat 525. As noted above, in some embodiments the thickness of the coating layer 502B is less than the thickness of the underlying coating layer 502A.

In one embodiment, the coating layers 502A and 502B are at least partially cured or hardened at a first curing stage 540 by applying at least one of thermal energy or radiation (for example, UV, electronic beams, and the like) on the coating layer 502B. In some embodiments, either or both of the coating layers 502A and 502B are fully hardened at the first curing stage 540 to form a hardened coating layer 572 on the first major surface 526 of the fibrous mat 525, or either or both of the coating layers 502A, 502B may be partially hardened (B-staged) at the first coating station 540 and fully hardened at a second curing station 550 to form the hardened coating layer 572 on the first major surface 526 by applying at least one of thermal energy or radiation to the second major surface 524 and through the fibers of the fibrous mat 525. In the schematic illustration of FIG. 4C, the locations and designs of the first and the second stages 540, 550 are merely provided as examples. The location and design of the coating, curing, and drying stations in the conveyor system 500 may vary widely, and additional stations may be added in multiple locations as needed.

After the underlying coating layer 502A and the coating layer 502B are fully hardened, a coated fibrous mat 570 is removed from the conveyor system 500. As discussed above, the coated fibrous mat 570 includes a coating layer 572 on a major surface thereof that is continuous or discontinuous, and can be porous or non-porous. The coating layer 572 has a thickness that is easily controllable, and the presence of the underlying coating layer 502A and the coating layer 502B on the first major surface of the fibrous mat 525 prevents fibers in the fibrous mat 525 from extending through the coating layer 572. As discussed above with respect to FIGS. 4A-4B, the coated fibrous mat 570 may optionally be further exposed to at least one of thermal energy or radiation to further harden or alter the properties of the coating layer 572 thereon.

In one embodiment, a supplementary coating composition may be applied to the at least partially hardened coating layer 372 during the wallboard manufacturing process to enhance the environmental resistance of the wallboard construction, or may be applied as a topcoat layer on the coating layer 372 after the wallboard manufacturing process is complete.

Figure 16B:
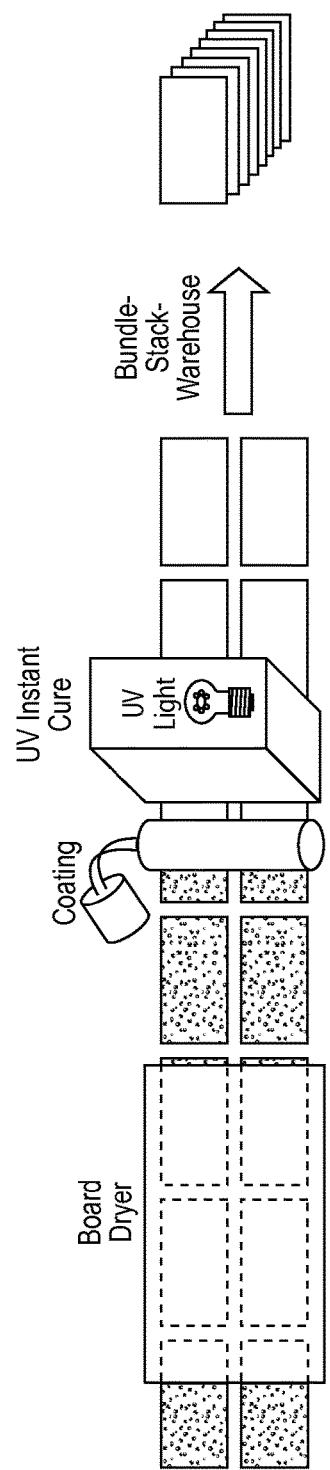
FIG. 16B is a schematic diagram of an in-line process for coating gypsum boards.

In certain embodiments, as illustrated in FIG. 16B, a method of making a coated gypsum panel includes applying a coating composition, such as an ultraviolet curable composition, to a first major surface of a gypsum panel having a gypsum core faced with a first fibrous mat, the first fibrous mat forming the first major surface of the gypsum panel. That is, the coating composition is applied to a preformed gypsum panel, such as a panel that has already been dried in an oven to set the gypsum and cut into desirable panel dimensions. The method then includes at least partially hardening or curing the coating composition, such as by applying radiation to the first major surface of the gypsum panel. The coating thickness may have an average penetration of the first fibrous mat that is less than a first thickness of the first fibrous mat, such as from about 5 percent to about 60 percent, or from about 30 percent to about 50 percent of the thickness of the fibrous mat. In some embodiments, a coating composition applied to a preformed gypsum panel may penetrate from about 5 percent to about 15 percent of a thickness of the fibrous mat, due to the set gypsum core penetrating a majority of the thickness of the fibrous mat. For example, the coating composition may penetrate the first fibrous mat to form an interface between the coating composition and the set gypsum.

For example, applying the coating composition to the gypsum panel may include slot coating, roll coating, curtain coating, or other suitable coating application techniques.

As discussed above, the coating layer is continuous or discontinuous, and can be porous or non-porous. The coating layer has a thickness that is easily controllable, and the presence of the coating layer on the first major surface of the fibrous mat prevents fibers in the fibrous mat from extending through the coating layer.

In some embodiments, the gypsum panel is precoated with an underlying coating layer on the first fibrous mat prior to application of the coating composition thereto. That is, the gypsum panel may be preformed to include one or more coating layers to which a further coating composition may be applied. In one embodiment, the underlying coating layer is formed from a composition that is different that the coating composition that forms the coating layer. In another embodiment, the underlying coating layer is formed from the same composition that forms the coating layer, such as an ultraviolet curable coating composition. In certain embodiments, the coating layer and any additional coating layers (e.g., the underlying coating layer) have a combined average penetration of the fibrous mat of less than the thickness of the fibrous mat, such as from about 10 percent to about 60 percent, or from about 30 percent to about 50 percent of the thickness of the fibrous mat. In some embodiments, the coating composition applied to a preformed and precoated gypsum panel may penetrate from about 5 percent to about 15 percent of a thickness of the fibrous mat, due to the set gypsum core and precoated layers penetrating a majority of the thickness of the fibrous mat. That is, the coating layer may be applied such that it is predominantly present at the first major surface of the fibrous mat, and may have a thickness extending outwardly from the first major surface of the fibrous mat.

Advantageously, the presently disclosed methods provide for precise application of a coating having a controlled weight and/or thickness to an article, such as a fibrous mat or gypsum panel. Articles manufactured by these methods may display a smoother face, less disengagement of fibers, fillers, and gypsum, as well as improved adhesion of other coatings and materials. That is, articles disclosed herein may limit the dusting and itching associated with traditional gypsum mat products In particular, the articles manufactured by these methods may have an increased smoothness, such as can be measured by atomic force measurement testing, as well as decreased fiber disengagement and dusting, such as can be measured by the standardized NIOSH 500 test method, as compared to articles manufactured via conventional means.

Various embodiments of the invention will now be described with reference to the following non-limiting examples.

EXAMPLES

Example 1

The components in Table 1 were used to coat a non-woven fiberglass mat with the following steps. The fibrous mat was non-woven fiberglass with an urea-formaldehyde binder. A 2-mil (0.05 mm) bird bar was used to create a drawdown on a 5 mil (0.13 mm) thick free film release paper with silicone finish available from Gardco under the trade designation PC-RP-1K. A 5 inch (13 cm)×12 inch (30 cm) strip of non-woven fiberglass mat was placed on top of the wet coating.

A 3.46 lb (1.6 kg) metal roller was rolled across the top of the mat. The system was cured by passing it through 3 UV lamps (1 gallium and 2 mercury bulbs) at a speed of 80 feet per minute (0.4 msec) with the mat side facing up. The release paper was removed from the cured coating and fibrous mat composite and the mat sent through the curing line a second time with the coating facing up.

TABLE 1

| Ingredient | Chemical | Sample 1 Wt % |
|---|---|---|
| Oligomer | Epoxy Acrylate | 20.99% |
| Reactive Diluent | Tripropylene glycol diacrylate | 8.94% |
| Photoactivator | | 3.39% |
| Photoinitiators | | 3.49% |
| Additive | Defoamer | 0.14% |
| Additive | Anti-Settling | 0.27% |
| Filler | Calcium Carbonate | 62.79% |
| Total | | 100% |

Figure 5A:
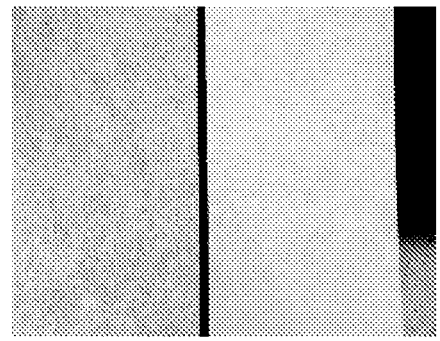
FIG. 5A is a photograph comparing the surfaces of an uncoated fiberglass mat (left) and the coated fiberglass mat of Example 1 (right).
Figure 5B:
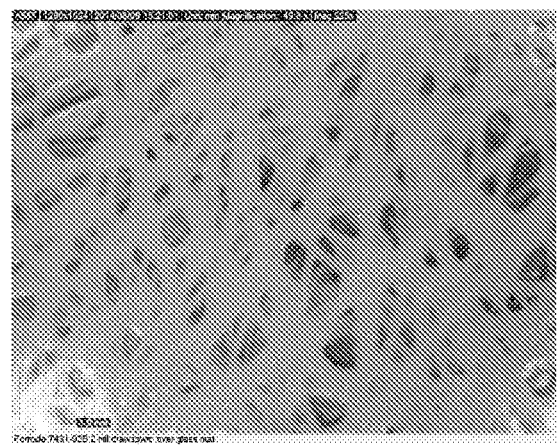
FIG. 5B is a photograph of a surface of a continuous coating layer on a major surface of the coated fiberglass mat of Example 1 showing the underlying embedded fibers.

The resulting coated and uncoated fibrous mat constructions are shown in FIGS. 5A-5B.

Example 2

The procedures of Example 1 were repeated using the components in Table 2. Coating was applied at 1.5 mil (0.04 mm) and 2 mil (0.05 mm) thickness.

TABLE 2

| Ingredient | Chemical | Sample 2 Wt % |
|---|---|---|
| Oligomer | Thermoplastic Acrylic Resin | 21.24% |
| Reactive Diluent | Tripropylene glycol diacrylate | 8.20% |
| Photoactivator | | 3.51% |
| Photoinitiators | | 3.61% |
| Additive | Defoamer | 0.07% |
| Additive | Anti-Settling | 0.28% |
| Filler | Calcium Carbonate | 56.08% |
| Filler | Talc | 7.01% |
| Total | | 100% |

Figure 6A:
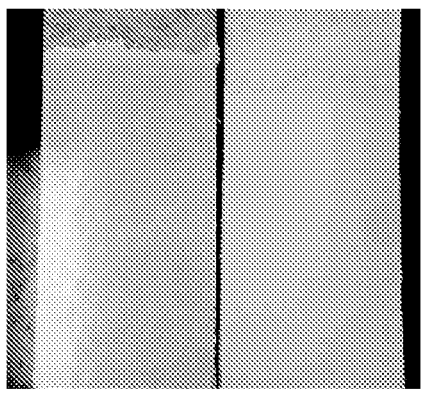
FIGS. 6A-6C are photographs of coated fiberglass mats made according to Example 2.
Figure 6B:
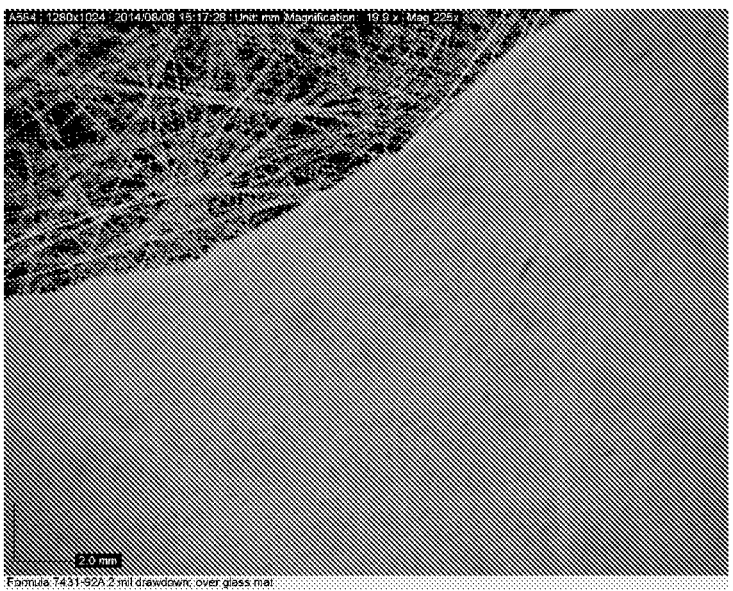
Figure 6C:
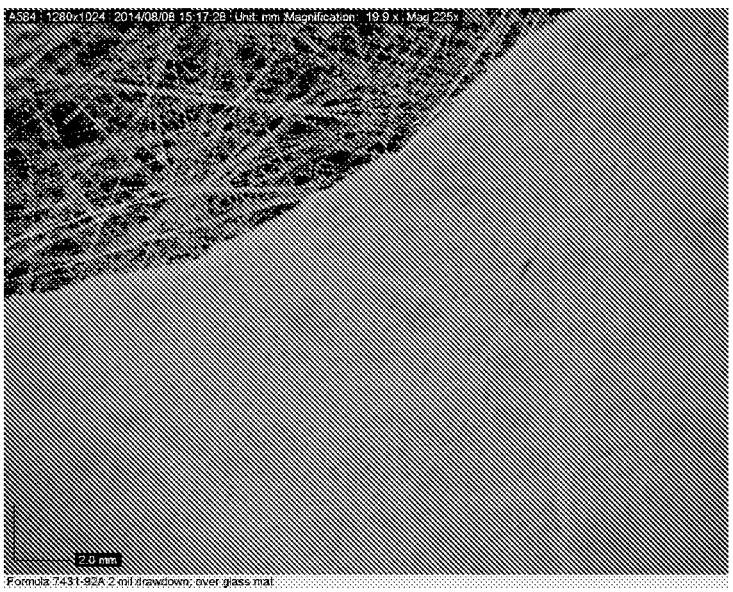

The resulting coated and uncoated fibrous mat constructions are shown in FIGS. 6A-6C.

Example 3

The procedure and compositional ranges of Example 1 were repeated using the components in Table 3, a water-borne coating formulation. The coating was applied at thickness of 3 wet mils (0.08 mm) with a bird bar and cured with 5 minutes in a 200° F. (93° C.) convection oven.

TABLE 3

| Ingredient | Chemical | Sample 3 Wt % |
|---|---|---|
| Polymer | Styrene-butadiene | 34.05% |
| Additives | Wetting Aid | 0.21% |
| Additives | Rheology Modifier | 0.41% |
| Additives | Antimicrobial | 0.37% |
| Additives | Dispersant | 0.39% |
| Additives | Defoamer | 0.23% |
| Additives | Defoamer | 0.30% |
| Additives | | 5.24% |
| Filler | | 53.54% |
| Filler | | 1.50% |
| Filler | | 3.74% |
| Total | | 100.0% |

Figure 7A:
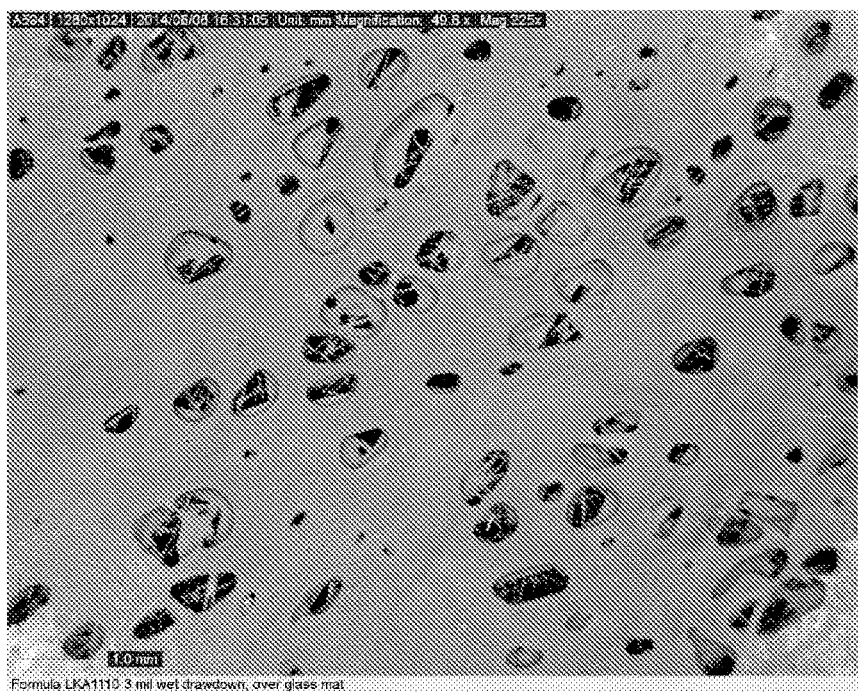
FIGS. 7A-7B are photographs of a surface of a of a 3 mil (0.08 mm) thick (wet) coating layer made according to Example 3 on a fibrous glass mat after release from a carrier material.
Figure 7B:
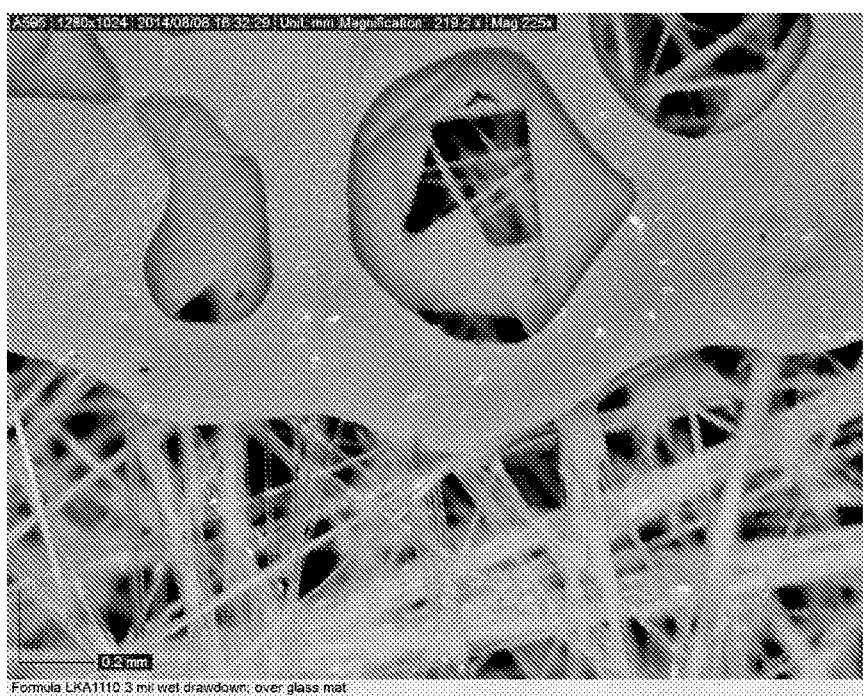

The resulting coated fibrous mat constructions are shown in FIGS. 7A-7C.

Example 4

The coating composition in Table 4 was used to coat the fiberglass mat of Example 1 and form a coating layer with the following steps. A 6-mil (0.15 mm) bird bar was used to prepare a drawdown on the free film release paper used in Example 1, and a 5 inch (13 cm)×12 inch (30 cm) strip of non-woven fiberglass mat was placed on top of the wet coating.

A 3.46 lb (1.6 kg) metal roller was rolled across the top of the mat. The system was dried in a 120° F. (49° C.) oven for 10 minutes and then cured by passing through UV lamps consisting of 2 mercury bulbs at 40% power at a speed of 16 feet per minute (0.08 m/sec). The release paper was removed from the cured coating and fibrous mat composite and the mat sent through the curing line a second time with the coating facing up.

TABLE 4

| Ingredient | Chemical | Sample 4 Wt % |
|---|---|---|
| Polymer | Styrene Acrylic | 21.78% |
| Polymer | Polyurethane Dispersion | 26.90% |
| Polymer | Polyurethane Dispersion | 9.18% |
| Reactive Diluent | Propoxylated Glycerol Triacrylate | 5.66% |
| Solvent | Water | 22.18% |
| Solvent | Isopropanol | 1.76% |
| Additive | UV Absorber | 0.22% |
| Additive | Defoamer | 0.21% |
| Photoinitiator | | 1.30% |
| Additives | | 9.96% |
| Filler | | 0.84% |
| | Total | 100% |

Figure 8:
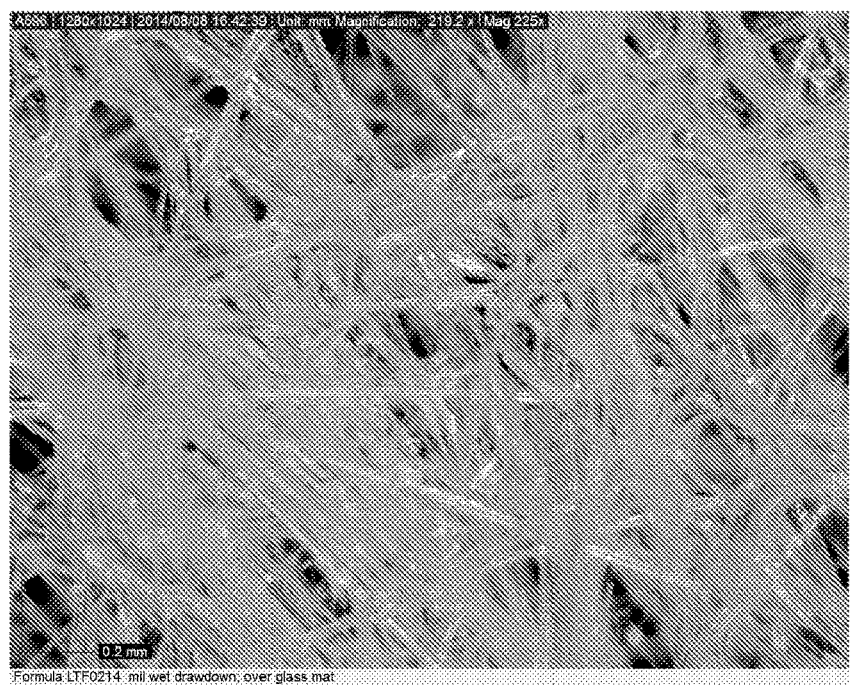
FIG. 8 is a photograph of a surface of a porous coating layer on a fibrous mat made according to the procedure of Example 4.

The resulting coated fibrous mat is shown in FIG. 8.

Example 5

Using the procedure described in Example 4, a coated mat was produced with a coating layer formed from the coating composition in Table 5 below.

Water and finely ground gypsum particles (stucco) were mixed and applied between fibrous glass mat layers and dried/calcined in a silicone mold to produce a half inch thick gypsum board.

For the calcining process the produced gypsum board was held at ambient temperature for 20 minutes then placed in a 180° F. (82° C.) oven for 45 minutes. Next the board was moved to an oven at 110° F. (43° C.) overnight to further reduce the excess moisture.

TABLE 5

| Ingredient | Chemical | Sample 5A Wt % |
|---|---|---|
| Oligomer | Polyether Acrylate | 25.02% |
| Reactive Diluent | Dipropylene glycol diacrylate | 6.26% |
| Photoinitiators | | 1.21% |
| Additive | Defoamer | 0.06% |
| Additive | Anti-Settling | 0.10% |
| Additive | Rheology Modifier | 0.56% |
| Additive | Rheology Modifier | 0.25% |
| Filler | Calcium Carbonate | 66.54% |
| | Total | 100.0% |

Figure 9:
FIG. 9 is a photograph of a surface of a continuous coating layer on a fibrous mat made according to Example 5.

The resulting gypsum board construction is shown in FIG. 9.

Example 6

The fibrous glass mat of Example 1 was dipped and saturated with a filler solution composed of water with 0.1 wt % nonionic surfactant and placed on a carrier board to provide material rigidity and uniform contact to the conveyor belt. The saturated fibrous mat was placed on the carrier paper of Example 1, passed through a curtain coater, and coated with 1.5 mils (0.04 mm) of the coating composition in Table 6 below to form a coating layer thereon.

TABLE 6

| Ingredient | Chemical | Wt % |
|---|---|---|
| Oligomer | Unsaturated Polyester | 18.63% |
| Reactive Diluent | Tripropyleneglycol Diacrylate | 15.94% |
| Additives | Rheology Modifier | 1.38% |
| Photoinitiators | | 2.05% |
| Additives | Anti-Settling | 1.38% |
| Additives | Anti-Settling | 0.35% |
| Additives | Anti-Settling | 0.05% |
| Filler | Calcium Carbonate | 60.47% |
| | Total | 100% |

Figure 10A:
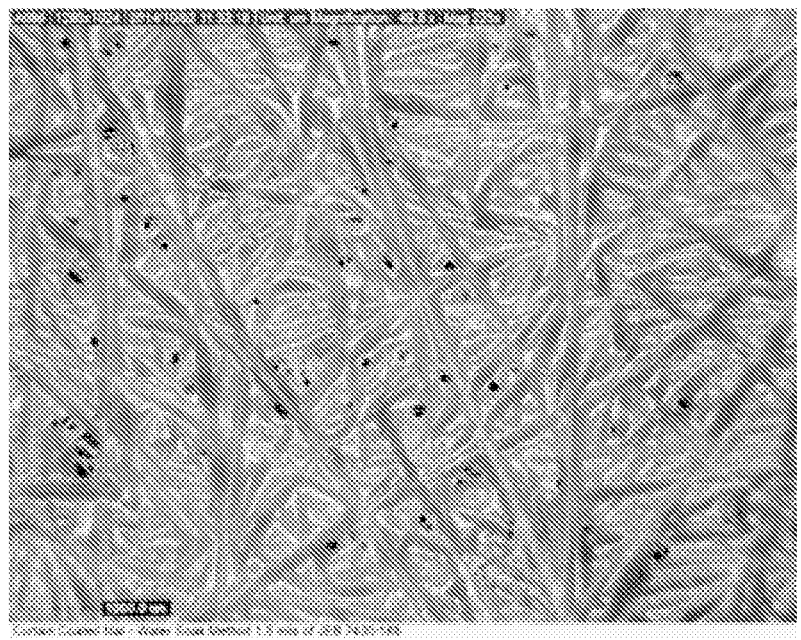
FIGS. 10A-10B are photographs of surfaces of coating layers on a fibrous mat made according to Example 6.
Figure 10B:
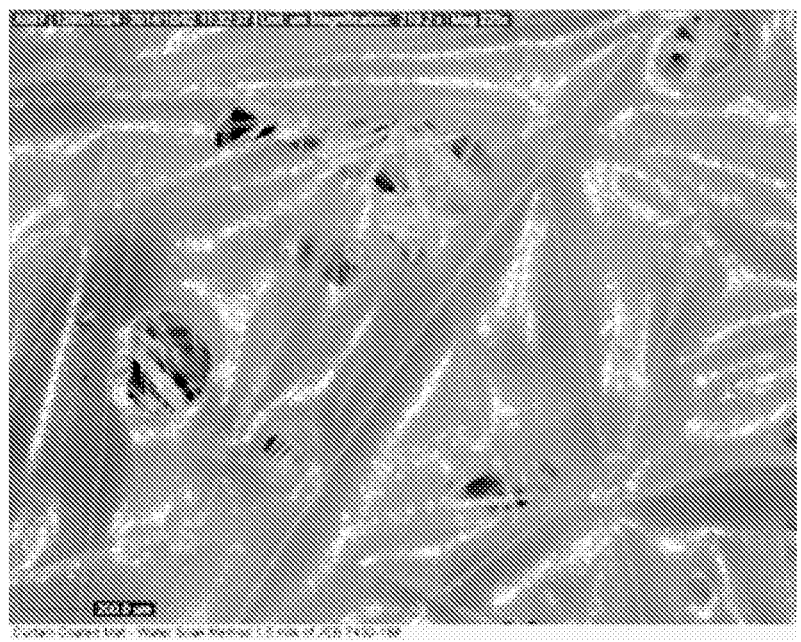

The coated wet fibrous glass mat and the carrier surface were sent coated face up through a UV curing line, which included a gallium bulb and 2 mercury lamps at 100% power with conveyor at 80 feet per minute (0.4 m/sec). The coated wet mat was separated from the carrier surface and passed through the curing line a second time with the coating facing down (previously touching carrier surface). The cured film-mat composite was placed in a 220° F. (104° C.) oven until dry. The resulting dried coating layer is shown in FIGS. 10A-10B.

Example 7

Using the materials and procedure described in Example 6 above, the coating composition of Table 7 below to the glass fiber mat saturated with a filler liquid to form a coating layer thereon.

TABLE 7

| Ingredient | Chemical | Wt % |
|---|---|---|
| Polymer | Polyether Acrylate | 13.85% |
| Reactive Diluent | Tripropyleneglycol Diacrylate | 8.84% |
| Reactive Diluent | 2-Ethoxy ethyl acrylate | 2.95% |
| Photoinitiators | | 1.56% |
| Additives | Anti-Settling | 0.12% |
| Additives | Dispersant | 1.18% |

TABLE 7-continued

| Ingredient | Chemical | Wt % |
|---|---|---|
| Additives | Dispersant | 0.29% |
| Filler | Calcium Carbonate | 71.21% |
| | Total | 100.0% |

A dry mat without a filler liquid was then coated with the coating composition of Table 7 using the procedure outlined above in Examples 1-2. The curtain coater applied a coating layer with a thickness of 1.5 mils (0.04 mm), and the coated fibrous glass mat was sent face up through a UV curing line using 1 gallium bulb and 2 mercury lamps at 100% power with conveyor at 80 fpm (0.4 m/sec). The coated mat was separated from the carrier surface and sent through the curing line a second time with the coating facing down (previously touching carrier surface).

A magnified view of dry (FIG. 11A) versus wet (FIG. 11B) application of the coating composition of Table 7 shows that, with the same amount of coating deposited in each case, the wet process (FIG. 11B) creates a more uniform film residing on the top surface of the fibrous mat.

Figure 11A:
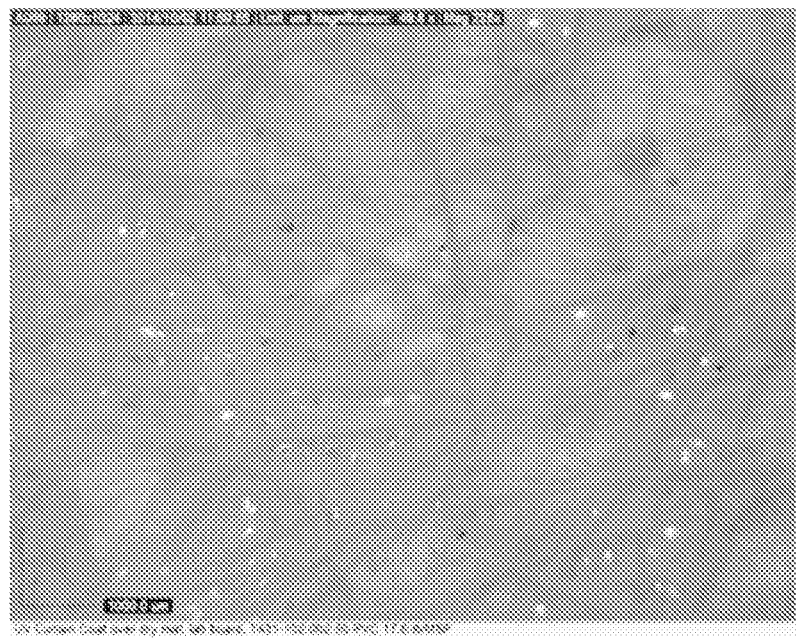
FIGS. 11A-11B are photographs of surfaces of coating layers on a fibrous mat made according to Example 7.
Figure 11B:
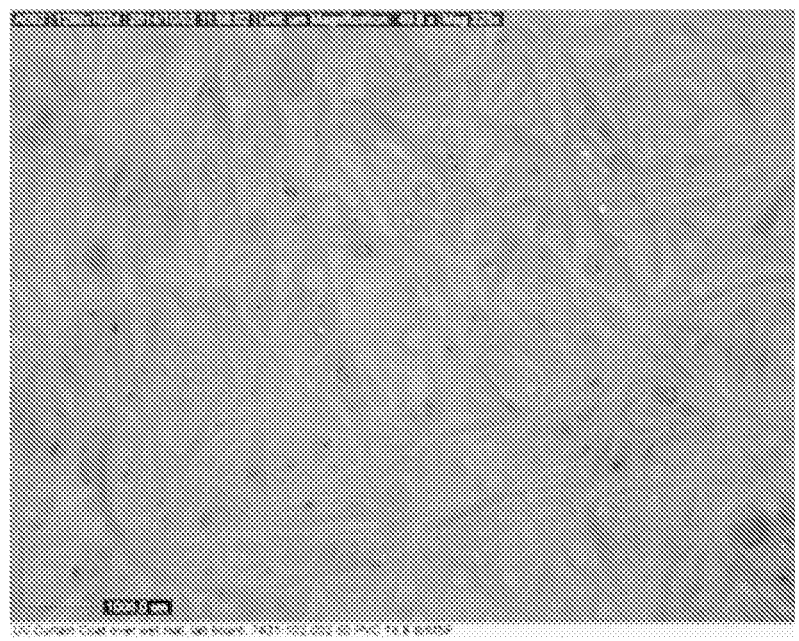

To make a gypsum board construction, the coated fibrous glass mats of FIG. 11A and FIG. 11B were used as the bottom face with a control panel on the top face. Water and finely ground gypsum particles (stucco) were mixed and applied between the fibrous glass mat layers and dried/calcined in a silicone mold to produce a half inch thick gypsum board. For the calcining process the produced gypsum board was held at ambient temperature for 20 minutes then placed in a 180° F. (82° C.) oven for 45 minutes. Next the board was moved to an oven at 110° F. (43° C.) overnight to further reduce excess moisture.

Figure 12A:
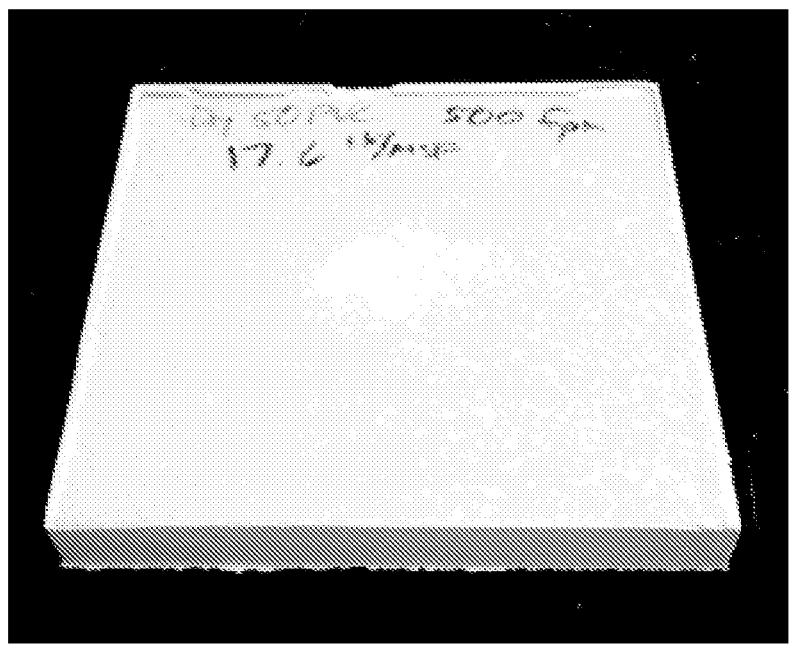
FIG. 12A is a photograph of a gypsum board made using the coated mat obtained from the dry coating process (FIG. 11A)
Figure 12B:
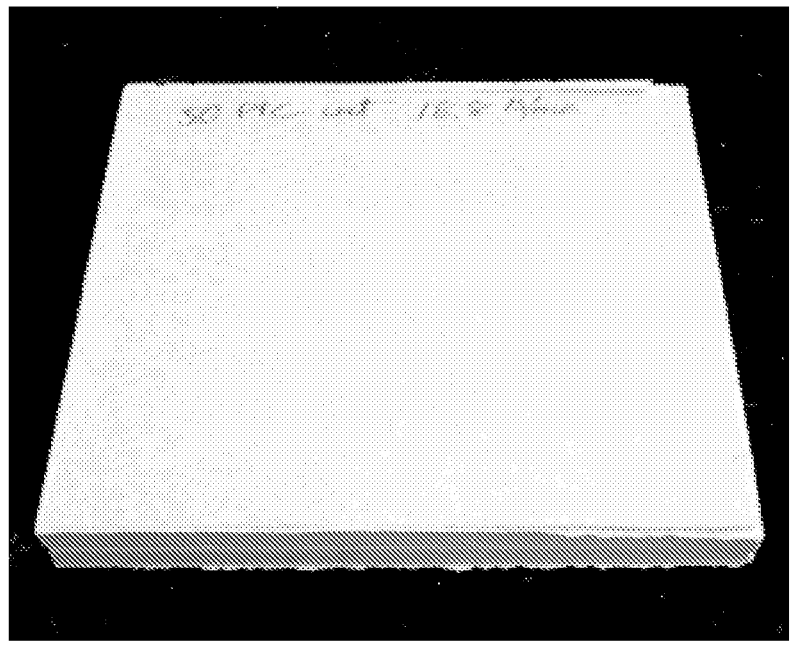
FIG. 12B is a photograph of a gypsum board made using the coated mat obtained from the wet coating process (FIG. 11B).

A side-by-side comparison of the resulting gypsum boards is shown in FIGS. 12A-12B. FIG. 12A shows the gypsum board made using the coated mat obtained from the dry coating process (FIG. 11A), and FIG. 12B shows the gypsum board made using the coated mat obtained from the wet coating process (FIG. 11B). At an equivalent coating layer thickness, the gypsum board of FIG. 12A has, relative to the gypsum board of FIG. 12B, uneven coating layer coverage and gypsum crystal growth through the coating layer.

Example 8

A doctor blade was used to draw the coating composition of Table 8, a high solids water-based formulation including an acrylic emulsion and a calcium carbonate filler, onto fibrous glass mat to form a first coating layer with a dry thickness of about 3 mils (0.08 mm). The mat used in this Example was the same as used in the previous Examples.

TABLE 8

| Ingredient | Chemical | (wt %) |
|---|---|---|
| Polymer | Acrylic Emulsion | 10.79% |
| Diluent | Water | 34.11% |
| Filler | Calcium Carbonate | 54.27% |
| Additives | Defoamer | 0.12% |
| Additives | Dispersant | 0.59% |
| Additives | Rheology Additive | 0.12% |
| | Total | 100.0% |

Figure 13A:
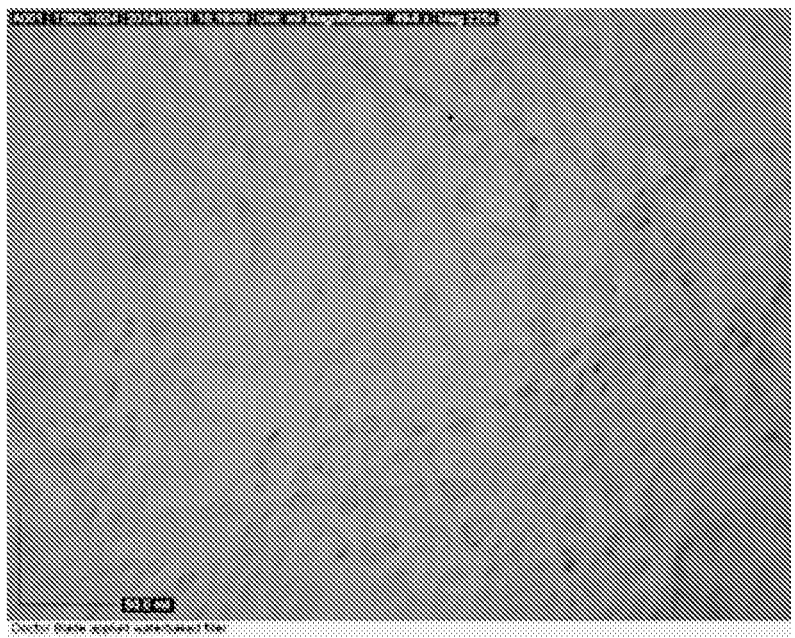
Figure 13B:
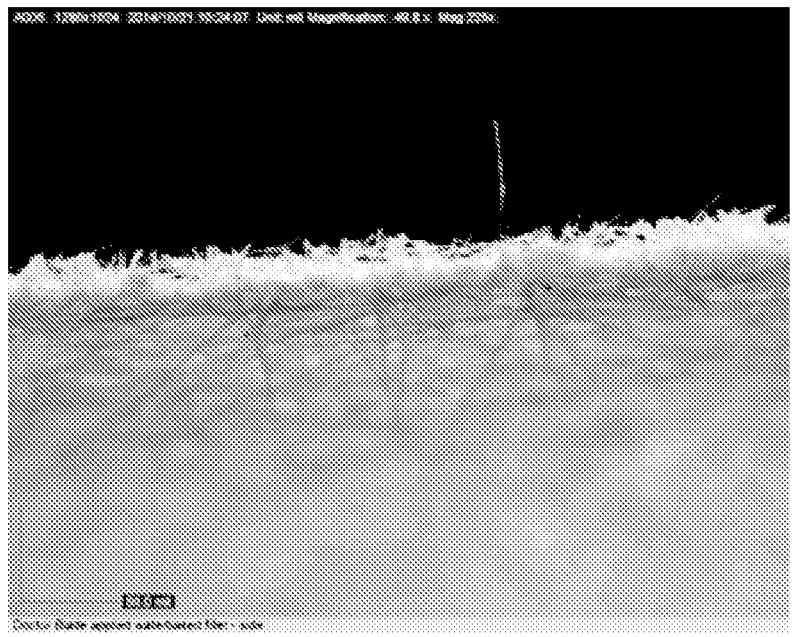
FIG. 13B is a cross-sectional view of the coated mat showing the uncoated fibers on the opposed surface.

FIG. 13A shows the first coating layer formed from the coating composition of Table 8, while FIG. 13B shows the free fibers on the uncoated opposed surface of the fibrous mat.

The coated wet fibrous glass mat was placed on a carrier surface and sent through a curtain coater to apply the coating composition of Table 9 below, a 100% solids formulation including an unsaturated polyester, to form a second coating layer on the first coating layer, with the second coating layer having a dry thickness of about 2 mils (0.05 mm).

TABLE 9

| Ingredient | Chemical | (wt %) |
|---|---|---|
| Oligomer | Unsaturated Polyester | 18.65% |
| Reactive Diluent | Tripropyleneglycol Diacrylate | 15.95% |
| Photoinitiators | | 2.03% |
| Additives | | 1.01% |
| Additives | Anti-Settling | 0.21% |
| Filler | Titanium Dioxide | 0.69% |
| Filler | Calcium Carbonate | 61.36% |
| | Total | 99.9% |

The coated mat and carrier surface were sent coated face up through a UV curing line including 1 gallium bulb and 2 mercury lamps at 100% power with conveyor at 80 fpm (0.4 m/sec). The coated wet mat was separated from the carrier surface and sent through the curing line a second time with the coating facing down (previously touching carrier surface).

Figure 14A:
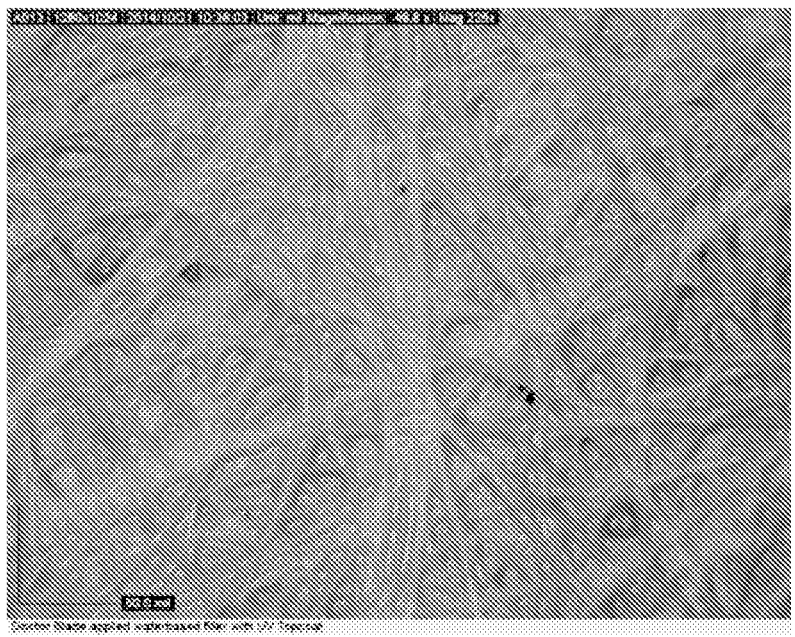
Figure 14B:
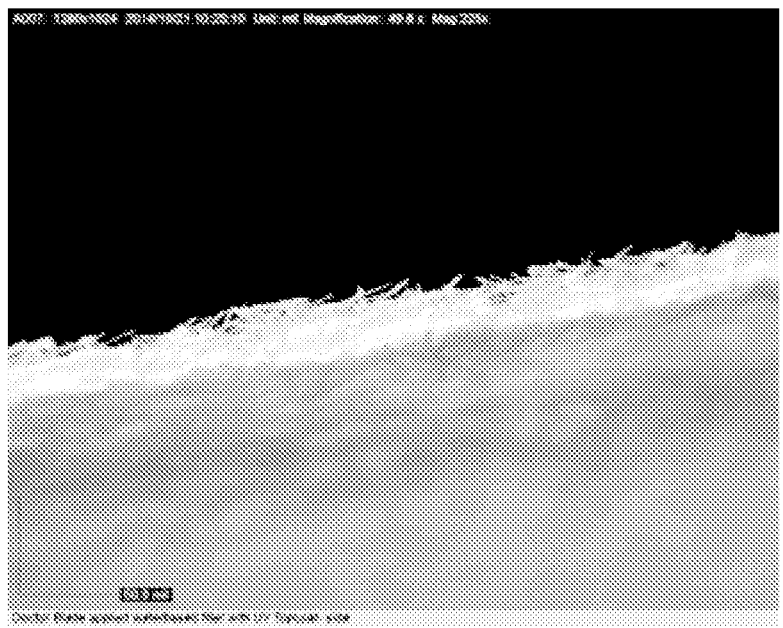
FIG. 14B is a cross-sectional view of the coated mat showing the uncoated fibers on the opposed surface.

FIG. 14A shows the surface of the second coating layer formed from the coating composition of Table 9 and overlying the first coating layer, while FIG. 14B shows the free fibers remaining on the uncoated opposed surface of the fibrous mat.

Figure 15B:
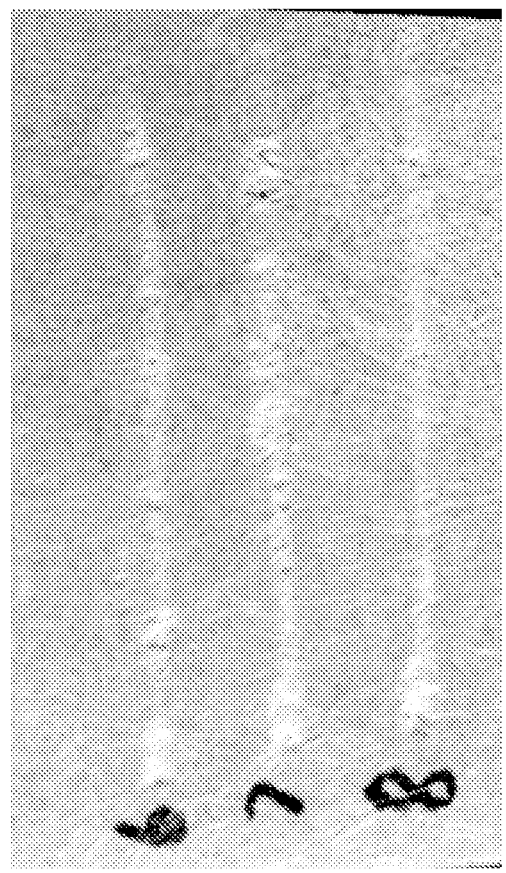
FIG. 15B is a photograph of a surface of a fibrous mat coated with only a single layer of the coating composition of Table 9. The numbers in FIGS. 15A-15B correlate to ×100 grams of weight applied with the Hoffman scratch tester moving from left to right.
Figure 15A:
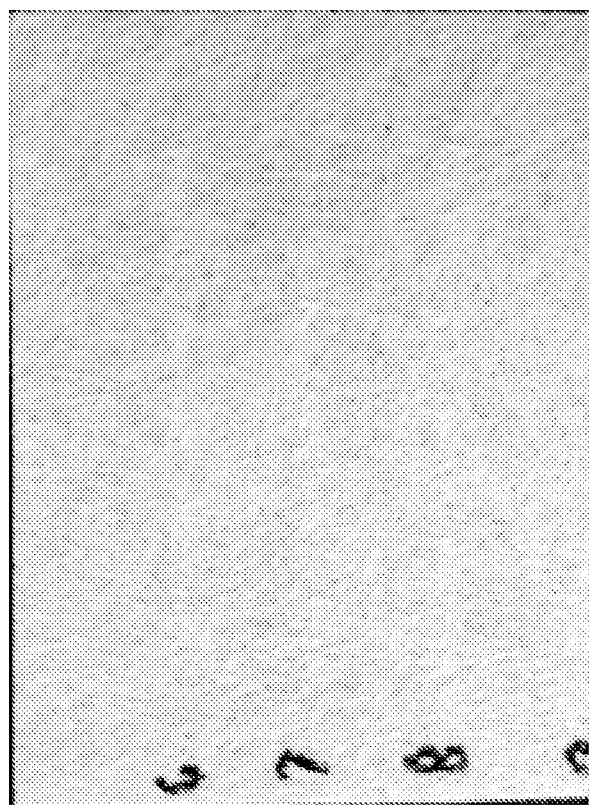

FIG. 15A shows the improved abrasion resistance of dual-coated construction of FIG. 14A above compared to a coated mat prepared with only a single layer derived from the coating composition of Table 9 (FIG. 15B). The numbers correlate to ×100 grams of weight applied with a Hoffman scratch tester moving from left to right. The tester used was obtained from BYK-Gardner under the trade designation PE-1610.

The image on the left displays a marred surface while the coating on the right suffers gouges and rips, exposing neat fiberglass when exposed to the same scratch weight.

Example 9

Coated mat samples were prepared using two different lab UV-cured coating methods—Release Belt and Curtain Coat—with two different precursor fiberglass mats and a high (about 20 lbs/MSF) (0.10 kg/m$^2$) and low (about 15 lbs/MSF) (0.08 kg/m$^2$) target coating weight, as shown in Table 10. Trial samples along with uncoated and precoated controls were used to form ½ inch (1.3 cm) gypsum panels. As described below, these boards were tested for physical properties and the results indicated feasibility for the use of these types of coatings in board applications (i.e., the physical properties of the coated mat samples were substantially the same, if not better, than the physical properties of coated mats made using the prior art thick waterborne coating methods). In particular, nail pull, Z-directional tensile, and humid bond test results were favorable.

TABLE 10

| Sample Numbers | Precursor Mat Basis Weight lb/CSF (kg/m²) | Coating Type | Coating Weight lbs/MSF (kg/m²) |
|---|---|---|---|
| 1-5 | 1.6 (0.08) | Belt | 15.6 (0.076) |
| 6-10 | 1.6 (0.08) | Belt | 20.6 |
| 11-15 | 2.1 (0.1) | Belt | 15.6 (0.076) |
| 16-18 | 1.6 (0.08) | Uncoated | — |
| 19-21 | 2.1 (0.1) | Uncoated | — |
| 101-105 | 1.6 (0.08) | Curtain | 15.2 (0.074) |
| 106-110 | 1.6 (0.08) | Curtain | 22.36 (0.109) |
| 111-115 | 2.1 (0.1) | Curtain | 15.2 (0.074) |
| 116-120 | 2.1 (0.1) | Curtain | 22.36 (0.109) |
| — | 1.6 (0.08) | Precoated | Control |
| — | 2.1 (0.1) | Precoated | Control |

Figure 17B:
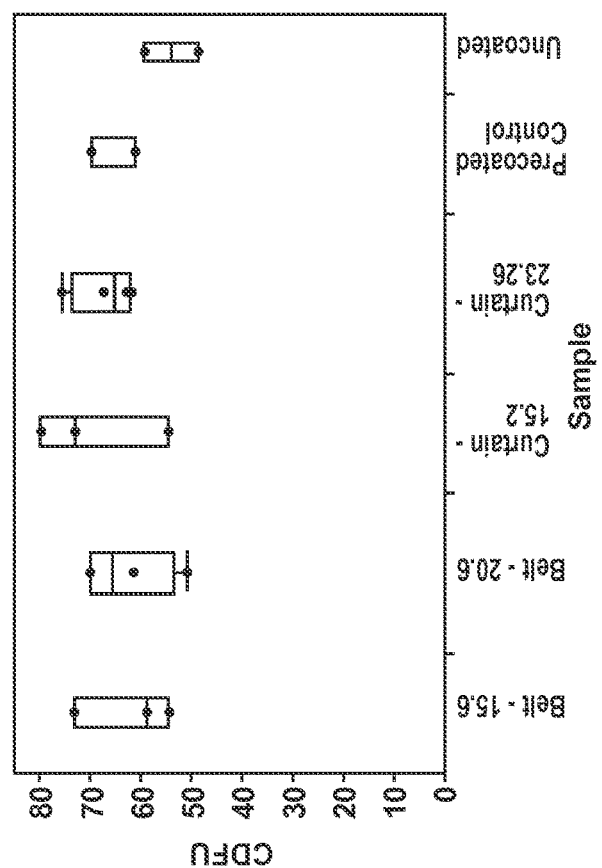
FIGS. 17A-17B show the flexural strength test results of samples using the 1.6 lb (0.73 kg) precursor mat, according to Example 9.
Figure 17A:
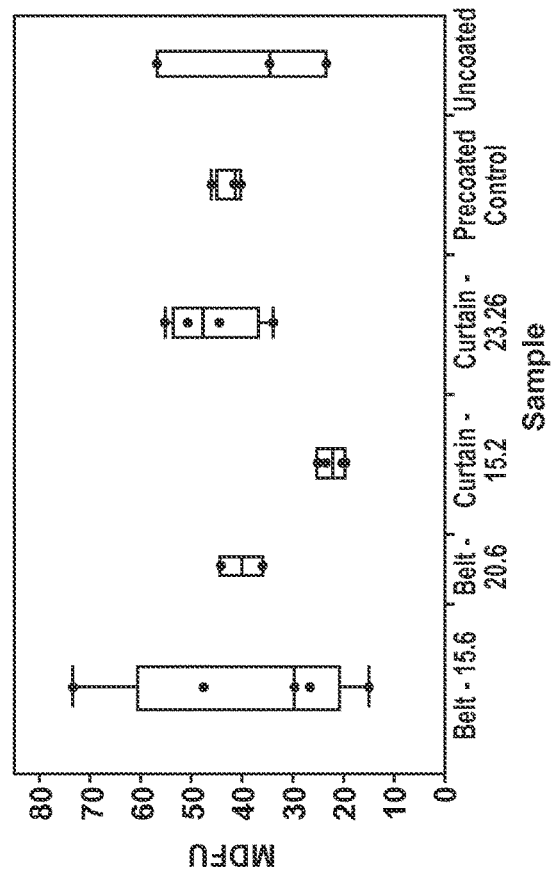
Figure 18B:
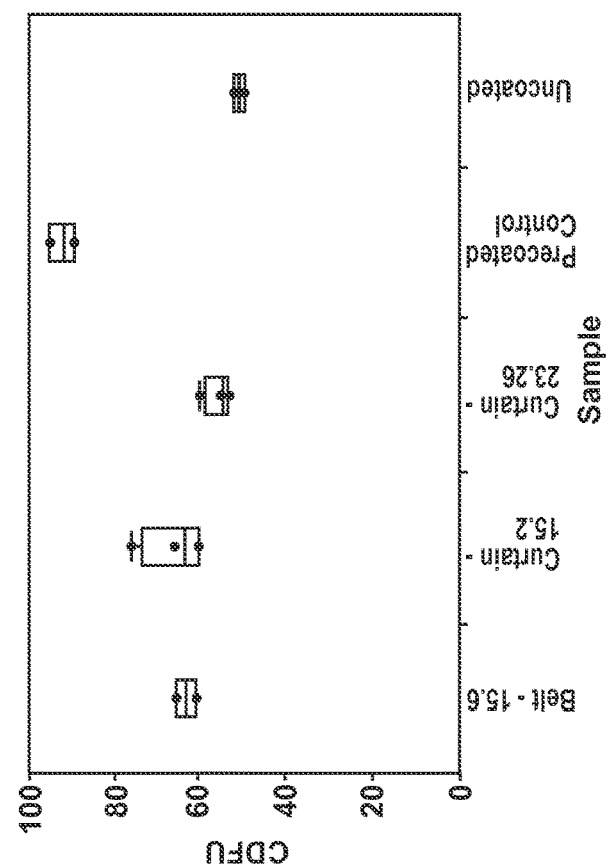
FIG. 18A-18B show the flexural strength test results of samples using the 2.1 lb (0.95 kg) precursor mat, according to Example 9.
Figure 18A:
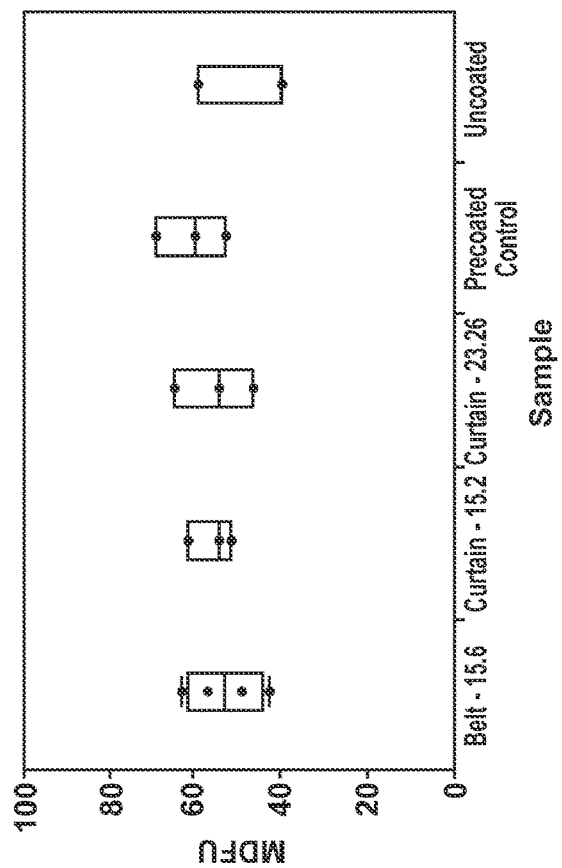

FIGS. 17A-17B show the flexural strength test results of samples using the 1.6 lb/csf (0.08 kg/m²) precursor mat. Overall, flexurals of trial samples were comparable to controls and the results indicate potential for these coatings to meet flexural physical requirements. FIG. 18A-18B show the flexural strength test results of samples using the 2.1 lb/csf (0.1 kg/m²) precursor mat. Overall, MDFU flexurals of trial samples with the heavy precursor mat were comparable to controls. The trial samples had lower CDFU flexural on average than pre-coated control.

Figure 19B:
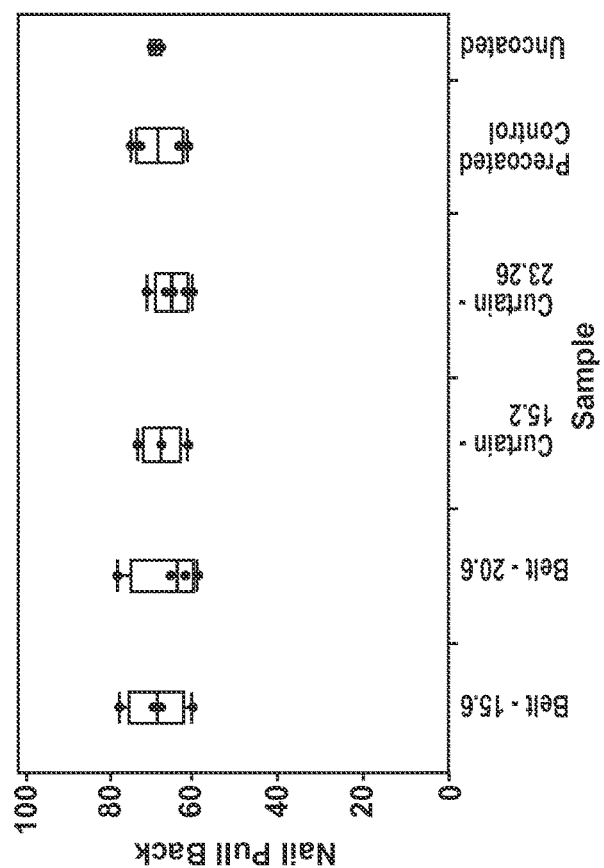
FIGS. 19A-19B show the nail pull test results of samples using the 1.6 lb (0.73 kg) precursor mat, according to Example 9.
Figure 19A:
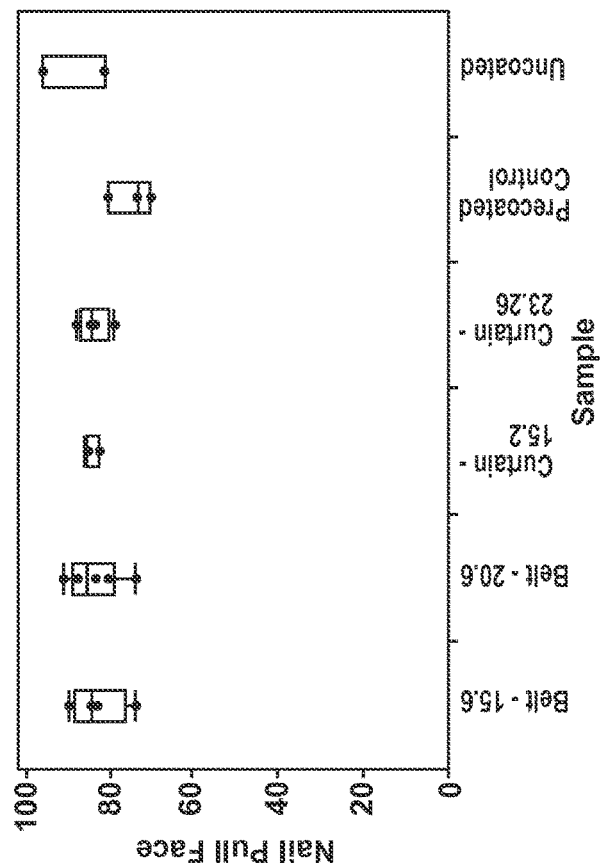
Figure 20A:
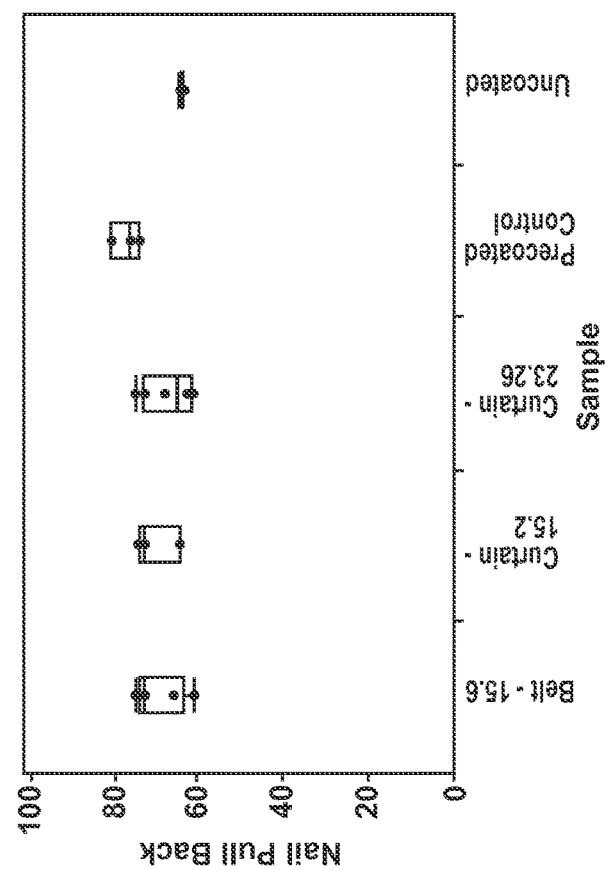
FIGS. 20A-20B show the nail pull test results of samples using the 2.1 lb (0.95 kg) precursor mat, according to Example 9.
Figure 20B:
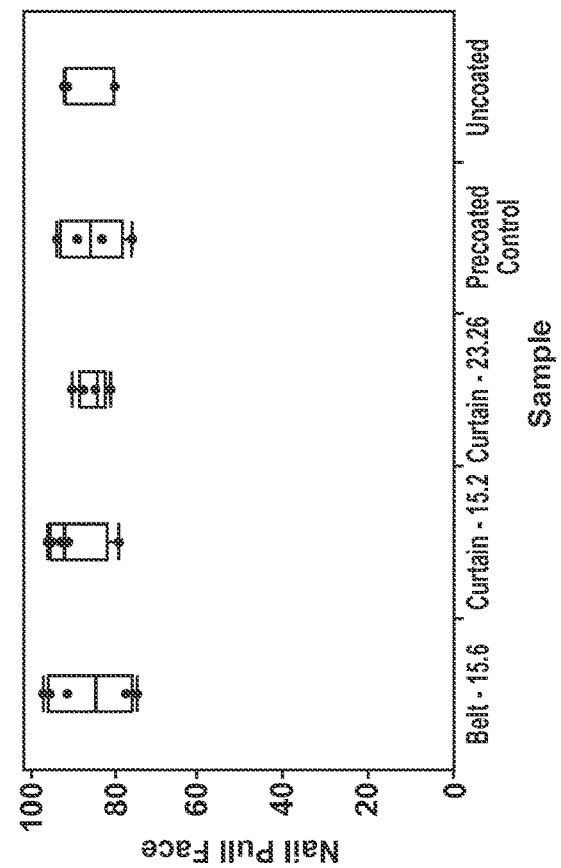

FIGS. 19A-19B show the nail pull test results of samples using the 1.6 lb/csf (0.08 kg/m²) precursor mat. FIGS. 20A-20B show the nail pull test results of samples using the 2.1 lb/csf (0.1 kg/m²) precursor mat. Overall, the trial samples compared similarly to controls in the nail pull tests.

Figure 21B:
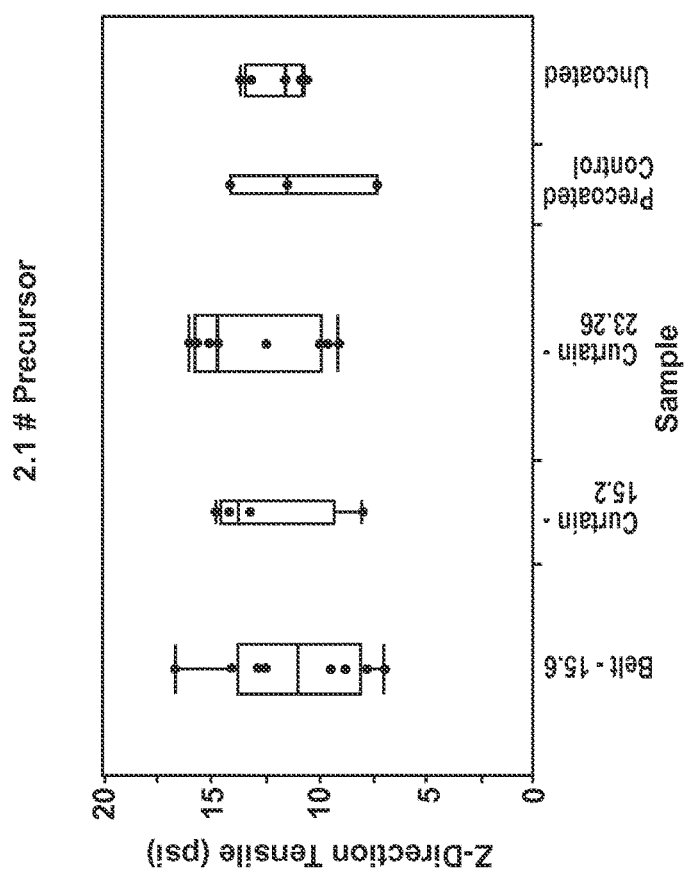
FIGS. 21A-21B show the Z-direction tensile test results of samples using the 1.6 lb (0.73 kg) and 2.1 lb (0.95 kg) precursor mats, according to Example 9.
Figure 21A:
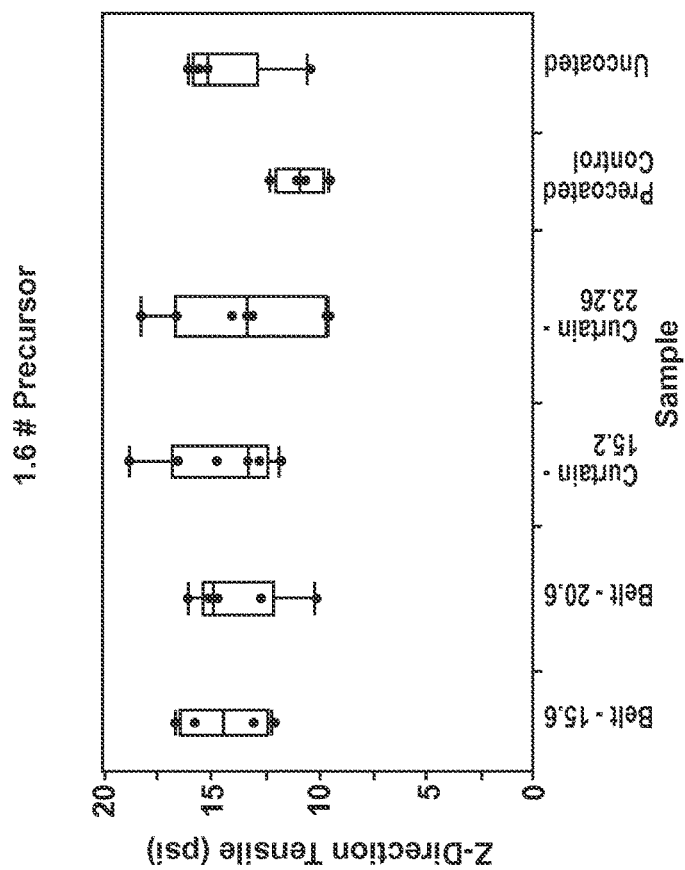

FIGS. 21A-21B show the Z-direction tensile test results of samples using the 1.6 lb (0.08 kg/m²) and 2.1 lb (0.1 kg/m²) precursor mats. Overall, the trial samples compared favorably to controls when measuring Z-direction tensile.

Figure 22B:
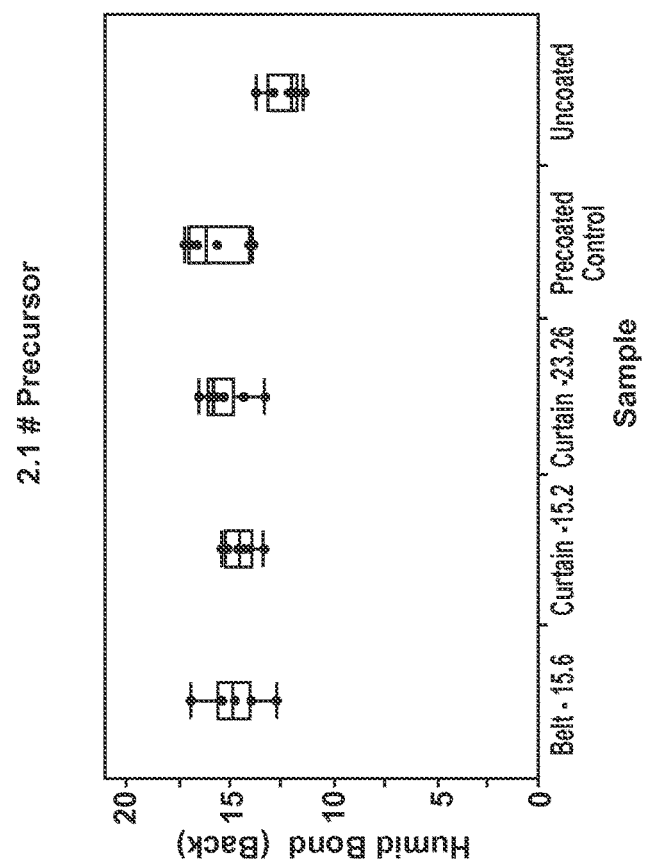
FIGS. 22A-22B show the humid bond test results of samples using the 1.6 lb and 2.1 lb precursor mats, according to Example 9.
Figure 22A:
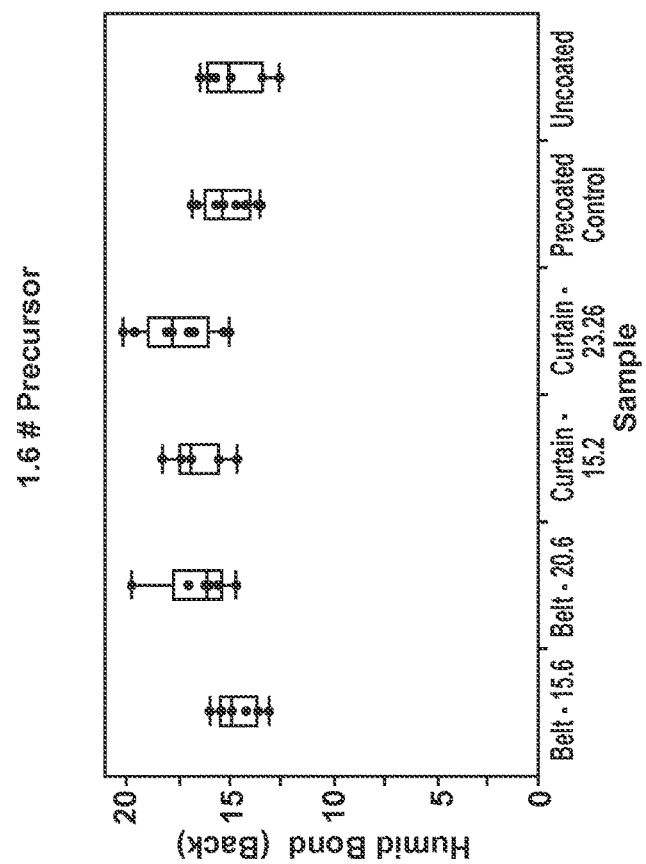
Figure 23B:
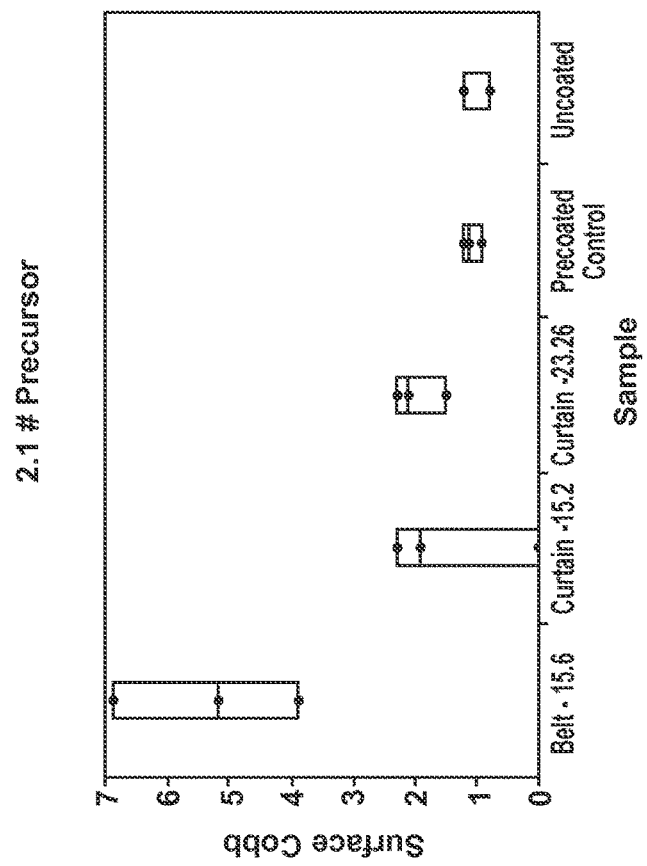
FIGS. 23A-23B show the surface Cobb test results of samples using the 1.6 lb (0.73 kg) and 2.1 lb (0.95 kg) precursor mats, according to Example 9.
Figure 23A:
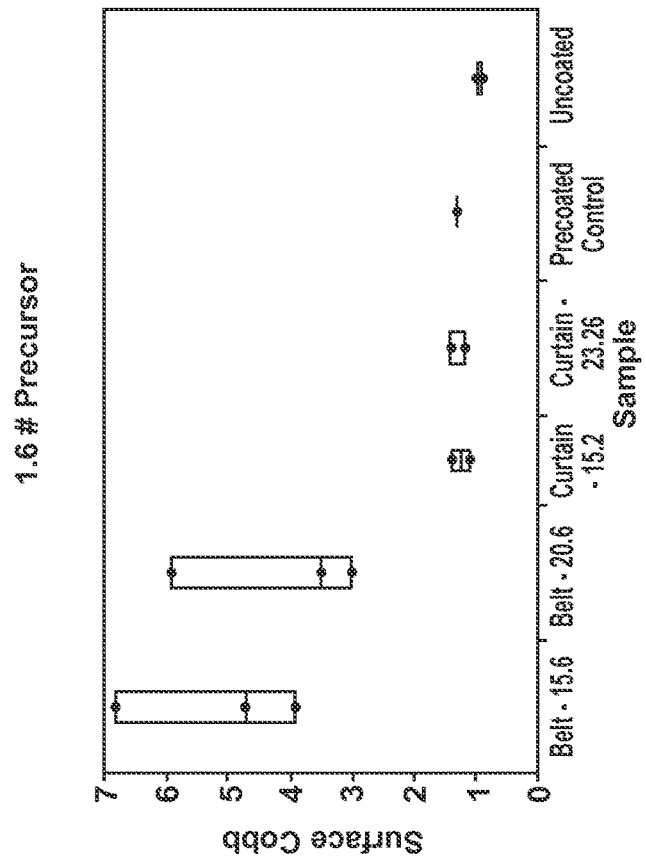

FIGS. 22A-22B show the humid bond test results of samples using the 1.6 lb (0.08 kg/m²) and 2.1 lb (0.1 kg/m²) precursor mats. Overall, the trial samples compared favorably to controls when measuring humid bond FIGS. 23A-23B show the surface Cobb test results of samples using the 1.6 lb (0.08 kg/m²) and 2.1 lb (0.1 kg/m²) precursor mats. Overall, the trial samples prepared with mat samples coated using release belt method had significantly higher surface Cobb than controls and curtain coated samples. The curtain coated samples were comparable to the controls, but on average were slightly higher than controls when using 2.1 lb (0.1 kg/m²) precursor.

Thus, the test results generally indicated the feasibility of the use of these types of coatings in board applications, because the physical properties of the coated mat samples were substantially the same, if not better, than the physical properties of coated mats made using the prior art thick waterborne coating methods. Thus, coated articles manufactured by the present methods have similar or improved properties to known coated articles, but require less coating materials and display a consistent coating thickness.

Example 10

A curtain coater was used to apply the coating composition of Table 11 below, a high solids water-based formulation including an acrylic emulsion and a calcium carbonate filler, onto a 52 inch (132 cm) wide fibrous glass mat.

Weight ranges were measured across the width of the mat, and are shown in Table 12 below.

TABLE 11

| Ingredient | Chemical | (wt %) |
|---|---|---|
| Polymer | Acrylic Emulsion | 9.8% |
| Diluent | Water | 24.3% |
| Filler | Calcium Carbonate | 63.9% |
| Additives | | 2.0% |
| Total | | 100.0% |

TABLE 12

| Sample Numbers | Coating Type | Coating Weight Range on Mat lbs/MSF (kg/m²) |
|---|---|---|
| 1-2 | Curtain Process 1 | 35.4 ± 4.41 (0.173 ± 0.022) |
| 3-4 | Curtain Process 1 | 29.9 ± 5.29 (0.146 ± 0.026) |
| 5-6 | Curtain Process 1 | 39.4 ± 5.29 (0.192 ± 0.026) |
| 7-8 | Curtain Process 1 | 34.4 ± 3.74 (0.168 ± 0.018) |
| 9-10 | Curtain Process 2 | 28.7 ± 2.42 (0.140 ± 0.012) |
| 11-12 | Curtain Process 2 | 28.6 ± 1.34 (0.140 ± 0.007) |
| 13-14 | Curtain Process 2 | 27.4 ± 1.32 (0.134 ± 0.006) |
| 15-16 | Curtain Process 2 | 27.3 ± 1.98 (0.133 ± 0.01) |

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various features of the invention have been described, it is to be understood that aspects of the invention may include only some of the described features. Moreover, while features of the embodiments have been discussed separately, it should be understood that any of the features disclosed herein may be combined in a gypsum panel core with or without any other of the features or combinations of features. Accordingly, the invention is not to be seen as limited by the foregoing description, but is only limited by the scope of the appended claims.

We claim:

1. A method of making a coated article, comprising:
depositing a coating composition on a carrier material;
at least partially embedding a first major surface of a fibrous mat in the coating composition, the fibrous mat comprising a plurality of mat fibers;
applying a filler liquid to the fibrous mat to displace a predetermined volume of the air residing between the mat fibers; and
at least partially hardening the coating composition to form a coating layer at the first major surface of the fibrous mat,
wherein a second major surface of the fibrous mat opposite the first major surface comprises an uncoated portion of the plurality of mat fibers, wherein a gypsum slurry is deposited on the second major surface of the fibrous mat, wherein depositing the gypsum slurry on the second major surface of the fibrous mat occurs in-line with depositing the coating composition on the carrier material, wherein the filler liquid controls depth of penetration of the coating composition into the second major surface and the filler liquid is removed to leave the coating composition to occupy a volume of the fibrous mat by the surface.

2. The method of claim 1, wherein at least partially hardening the coating composition comprises applying radiation through the second major surface of the fibrous mat or through the carrier material.

3. The method of claim 2, further comprising separating the coating layer from the carrier material and further hardening the coating layer.

4. The method of claim 1, wherein:
at least partially hardening the coating composition comprises applying radiation to the second major surface of the fibrous mat prior to removing the coating layer from the carrier material, and
the coating layer is further hardened by applying thermal energy to the coating layer after the coating layer is removed from the carrier material.

5. The method of claim 1, wherein the carrier material is chosen from silicone rubber, a polymeric film, fiberglass or fabric coated with are lease coating, parchment paper, and coated papers.

6. The method of claim 1, wherein the coating composition is ultraviolet curable and is chosen from an epoxy acrylate, a polyester, and a thermoplastic acrylic.

7. The method of claim 1, wherein the mat fibers are glass fibers.

8. The method of claim 1, wherein the coating layer has an average penetration of the fibrous mat of from about 10 percent to about 60 percent of a first thickness of the fibrous mat.

9. The method of claim 1, wherein the coating layer has a Gurley porosity of from about 1 second to about 60 seconds.

10. The method of claim 1, wherein the coating layer has a weight of from about 5 lb/msf (0.024 kg/m.sup.2) to about 50 lb/msf (0.24 kg/m.sup.2).

11. The method of claim 1, wherein the coating layer has a thickness of less than about 2.5 mils (0.06 mm).

12. The method of claim 1, wherein:
the coating composition is ultraviolet curable,
at least partially hardening the coating composition comprises applying radiation through the second major surface of the fibrous mat, and
the coating layer has an average penetration of the fibrous mat of less than a first thickness of the fibrous mat.

13. The method of claim 12, wherein the coating layer has an average penetration of the fibrous mat of from about 30 percent to about 50 percent of the first thickness.

14. The method of claim 12, wherein the coating composition is chosen from an epoxy acrylate, a polyester, and a thermoplastic acrylic.

15. The method of claim 1 further comprising at least partially embedding the first surface of the fibrous mat in the coating composition, and at least partially hardening the coating composition.

16. A method of making a coated article according to claim 1, further comprising:
wherein the depositing step comprises applying an ultraviolet curable coating composition to a first major surface of a fibrous mat comprising a plurality of mat fibers; and
wherein the partially hardening step comprises applying radiation to the fibrous mat to at least partially cure the ultraviolet curable coating composition and form a coating layer at the first major surface of the fibrous mat.

17. A method for forming a coating layer on a fibrous mat, comprising:
depositing a coating composition on a carrier material;
at least partially embedding a first major surface of a fibrous mat in the coating composition, wherein the fibrous mat comprises an arrangement of mat fibers;
applying a filler liquid to the fibrous mat to displace a predetermined volume of air residing between the mat fibers;
depositing a coating composition on a second major surface of the fibrous mat opposite the first major surface, the coating composition being immiscible with the filler liquid and forming an interface with the filler liquid; and
at least partially hardening the coating composition to form a coating layer concentrated on the first major surface of the fibrous mat, wherein a second major surface of the fibrous mat opposite the first surface comprises a plurality of free uncoated mat fibers, wherein the filler liquid controls depth of penetration of the coating composition into the second major surface and the filler liquid is removed to leave the coating composition to occupy a volume of the fibrous mat by the surface.

18. The method of claim 17, wherein the steps form a coated article by:
contacting a first major surface of a fibrous mat with a carrier material, the fibrous mat comprising a plurality of mat fibers; and
at least partially hardening the coating composition to form a coating layer extending at least between the interface and the second major surface of the fibrous mat.

19. The method of claim 17, wherein the coating layer is hardened by applying UV radiation through the second major surface of the fibrous mat or through the carrier material.

20. The method of claim 17, wherein the coating layer is partially hardened by applying radiation to the second major surface of the fibrous mat prior to removing the coating layer from the carrier material, and the coating layer is fully hardened by applying thermal energy to the coating layer after the coating layer is removed from the carrier material, and wherein the carrier material is selected from silicone rubber, a polymeric film, fiberglass or fabric coated with a release coating, parchment paper, and coated papers.

21. The method of claim 17, wherein the fibrous mat comprises glass fibers.

22. The method of claim 17, wherein the coating layer has a thickness of less than about 2 mils (0.05 mm).

23. The method of claim 22, wherein the coating layer is non-porous and substantially continuous over the first major surface of the fibrous mat, and wherein the method further comprises applying a topcoat over the coating layer.

24. A method for forming a coating layer on a fibrous mat, comprising:
contacting a first major surface of the fibrous mat with a carrier material, wherein the fibrous mat comprises an arrangement of mat fibers, wherein a coating is applied on the first major surface;
applying a filler liquid to the fibrous mat to displace a predetermined volume of the air residing between the mat fibers;
depositing a coating composition on a second major surface of the fibrous mat, wherein the second major surface is opposite the first major surface, and wherein the filler liquid is immiscible with the coating composition and forms an interface with the coating composition; and at least partially hardening the coating composition to form a coating layer at the interface with the filler liquid, wherein the coating layer is concentrated on the second major surface of the fibrous mat, wherein the second major surface of the fibrous mat opposite the first surface comprises a plurality of free uncoated mat fibers, wherein the filler liquid controls depth of penetration of the coating composition into the second major surface and the filler liquid is removed to leave the coating composition to occupy a volume of the fibrous mat by the surface.

25. The method of claim 17, comprising:

contacting a fibrous mat with a carrier material, wherein the fibrous mat comprises an arrangement of mat fibers;

applying a first coating composition to the fibrous mat;

applying a second coating composition on the first coating composition, wherein the second coating composition is different from the first coating composition; and at least partially hardening at least the second coating composition to form a coating layer concentrated on a major surface of the fibrous mat.

26. The method of claim 17, wherein the coating layer has a thickness less than the thickness of the fibrous mat, wherein substantially no mat fibers protrude from the coating layer, and wherein mat fibers protrude from the first major surface of the fibrous mat.

* * * * *